(12) United States Patent
Hasegawa

(10) Patent No.: US 11,087,480 B2
(45) Date of Patent: Aug. 10, 2021

(54) IMAGE PROCESSING APPARATUS AND IMAGE PROCESSING METHOD

(71) Applicant: SONY CORPORATION, Tokyo (JP)

(72) Inventor: Yuichi Hasegawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 206 days.

(21) Appl. No.: 16/319,385

(22) PCT Filed: Jul. 20, 2017

(86) PCT No.: PCT/JP2017/026184
§ 371 (c)(1),
(2) Date: Jan. 21, 2019

(87) PCT Pub. No.: WO2018/025642
PCT Pub. Date: Feb. 8, 2018

(65) Prior Publication Data
US 2019/0279381 A1 Sep. 12, 2019

(30) Foreign Application Priority Data

Aug. 3, 2016 (JP) .............................. JP2016-152526

(51) Int. Cl.
*G06T 7/536* (2017.01)
*G06T 7/529* (2017.01)
(Continued)

(52) U.S. Cl.
CPC .............. *G06T 7/536* (2017.01); *G06T 7/529* (2017.01); *G06T 7/593* (2017.01); *G06T 11/001* (2013.01); *G06T 19/00* (2013.01)

(58) Field of Classification Search
CPC .......... G06T 7/536; G06T 19/00; G06T 7/529; G06T 7/593; G06T 11/001; G06T 3/4053
See application file for complete search history.

(56) References Cited

U.S. PATENT DOCUMENTS

| 6,762,789 B1 * | 7/2004 | Sogabe ................... H04N 7/18 348/36 |
| 2013/0071012 A1 * | 3/2013 | Leichsenring ....... H04N 13/128 382/154 |

(Continued)

FOREIGN PATENT DOCUMENTS

| CN | 1315114 A | 9/2001 |
| CN | 102812497 A | 12/2012 |

(Continued)

OTHER PUBLICATIONS

International Search Report and Written Opinion of PCT Application No. PCT/JP2017/026184, dated Oct. 10, 2017, 07 pages of ISRWO.

(Continued)

*Primary Examiner* — Wesley J Tucker
(74) *Attorney, Agent, or Firm* — Chip Law Group

(57) ABSTRACT

Provided is a drawing section that generates a display image from a predetermined viewpoint by using a texture image and a depth image of a first layer and using a texture image and a depth image of a second layer in which a range of information indicated by a pixel value is different from at least one of the texture image or the depth image of the first layer.

10 Claims, 23 Drawing Sheets

(51) Int. Cl.
  *G06T 7/593* (2017.01)
  *G06T 11/00* (2006.01)
  *G06T 19/00* (2011.01)

(56) References Cited

U.S. PATENT DOCUMENTS

| | | | |
|---|---|---|---|
| 2017/0150115 A1* | 5/2017 | Vandewalle | H04N 13/351 |
| 2019/0230280 A1* | 7/2019 | Kikukawa | H04N 13/111 |
| 2019/0238819 A1* | 8/2019 | Furukawa | G06T 15/205 |
| 2019/0287289 A1* | 9/2019 | Araki | G06T 15/10 |
| 2020/0007845 A1* | 1/2020 | Fukuyasu | H04N 5/23238 |
| 2020/0320747 A1* | 10/2020 | Izumi | G06T 19/00 |
| 2020/0322586 A1* | 10/2020 | Lee | H04N 21/81 |

FOREIGN PATENT DOCUMENTS

| | | |
|---|---|---|
| EP | 1117256 A1 | 7/2001 |
| JP | 2001-008232 A | 1/2001 |
| JP | 2003-115057 A | 4/2003 |
| JP | 2006-014174 A | 1/2006 |
| WO | 2012/117729 A1 | 9/2012 |

OTHER PUBLICATIONS

Office Action for JP Patent Application No. 2018-531825, dated Jun. 1, 2021, 03 pages of English Translation and 03 pages of Office Action.

* cited by examiner

FIG. 9

| FILE NAME | AZIMUTH | ELEVATION ANGLE | ROTATION ANGLE | LINE-OF-SIGHT VECTOR (X, Y, Z) | | | VIEWPOINT POSITION INFORMATION (X, Y, Z) | | | HORIZONTAL ANGLE OF VIEW | VERTICAL ANGLE OF VIEW | NUMBER OF HORIZONTAL PIXELS | NUMBER OF VERTICAL PIXELS |
|---|---|---|---|---|---|---|---|---|---|---|---|---|---|
| posZ | 0° | 0° | 0° | 0 | 0 | +1 | 0 | 0 | 0 | 100° | 100° | 1024 | 1024 |
| negZ | −180° | 0° | 0° | 0 | 0 | −1 | 0 | 0 | 0 | 100° | 100° | 1024 | 1024 |
| posX | +90° | 0° | 0° | +1 | 0 | 0 | 0 | 0 | 0 | 100° | 100° | 1024 | 1024 |
| negX | −90° | 0° | 0° | −1 | 0 | 0 | 0 | 0 | 0 | 100° | 100° | 1024 | 1024 |
| posY | 0° | +90° | 0° | 0 | +1 | 0 | 0 | 0 | 0 | 100° | 100° | 1024 | 1024 |
| negY | 0° | −90° | 0° | 0 | −1 | 0 | 0 | 0 | 0 | 100° | 100° | 1024 | 1024 |

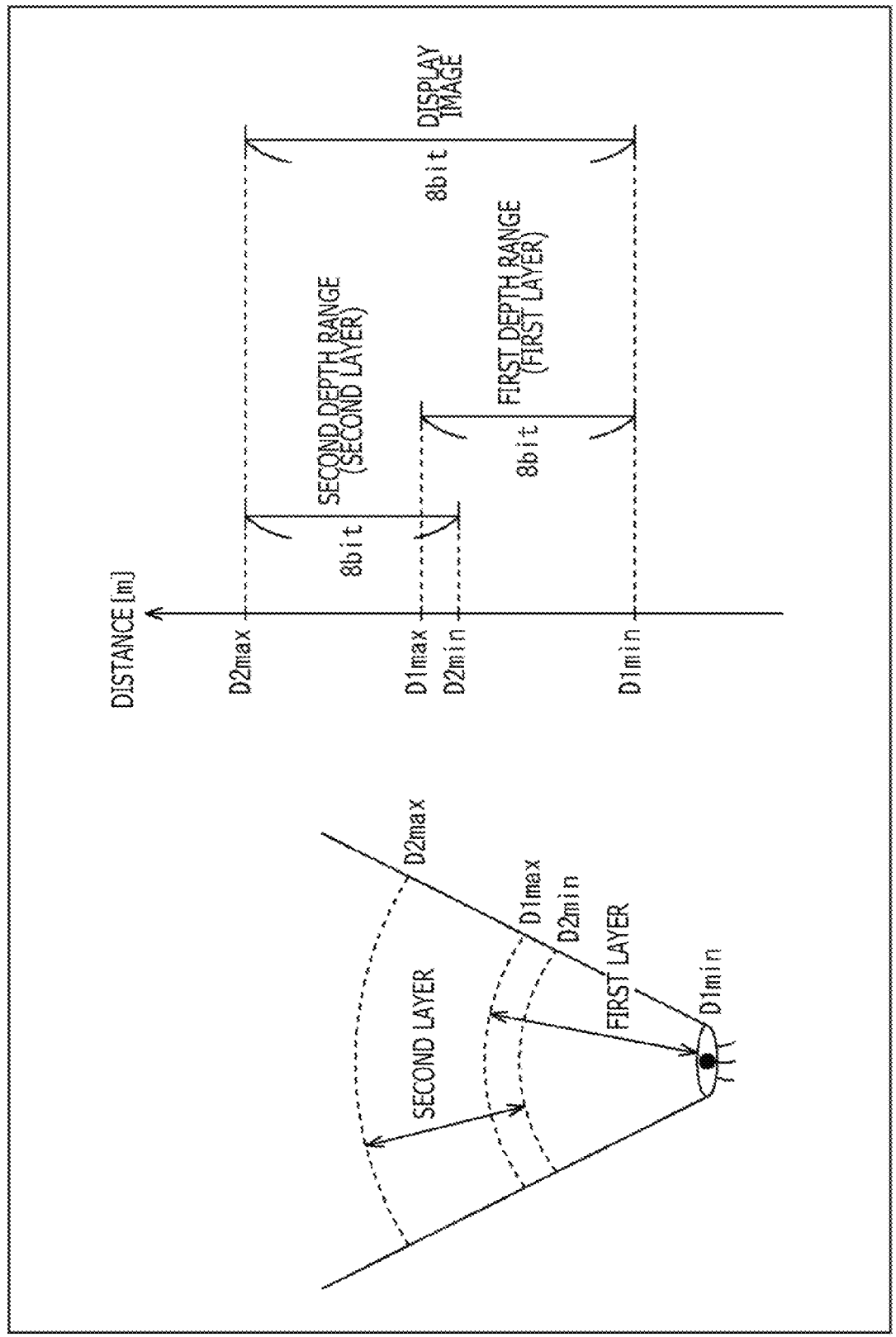

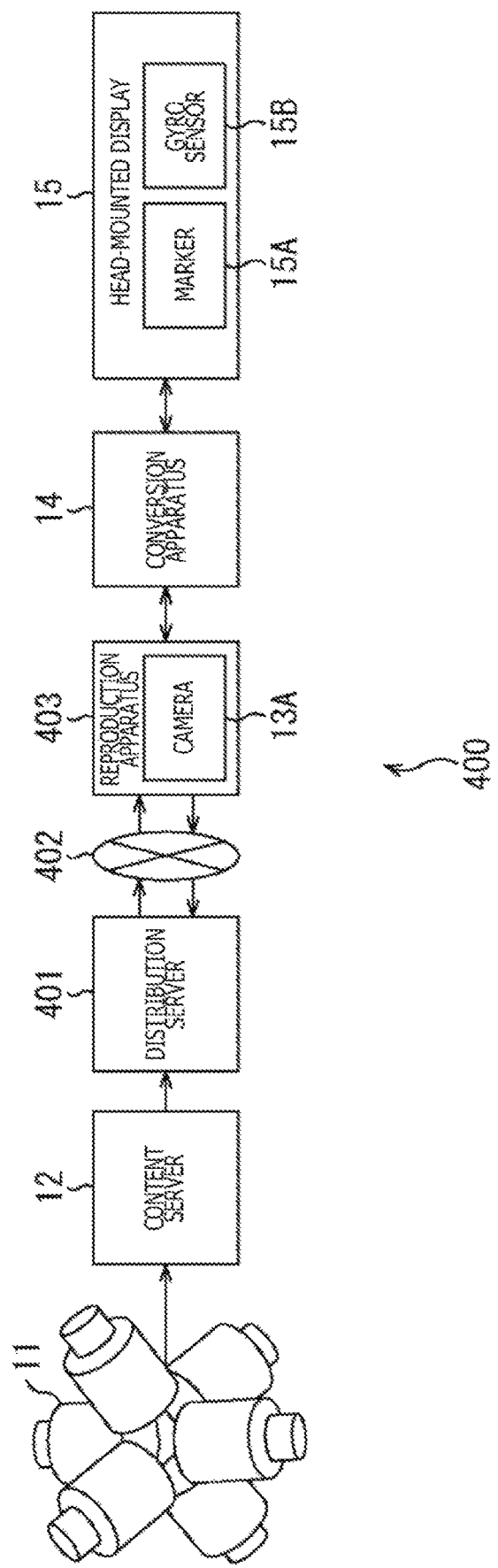

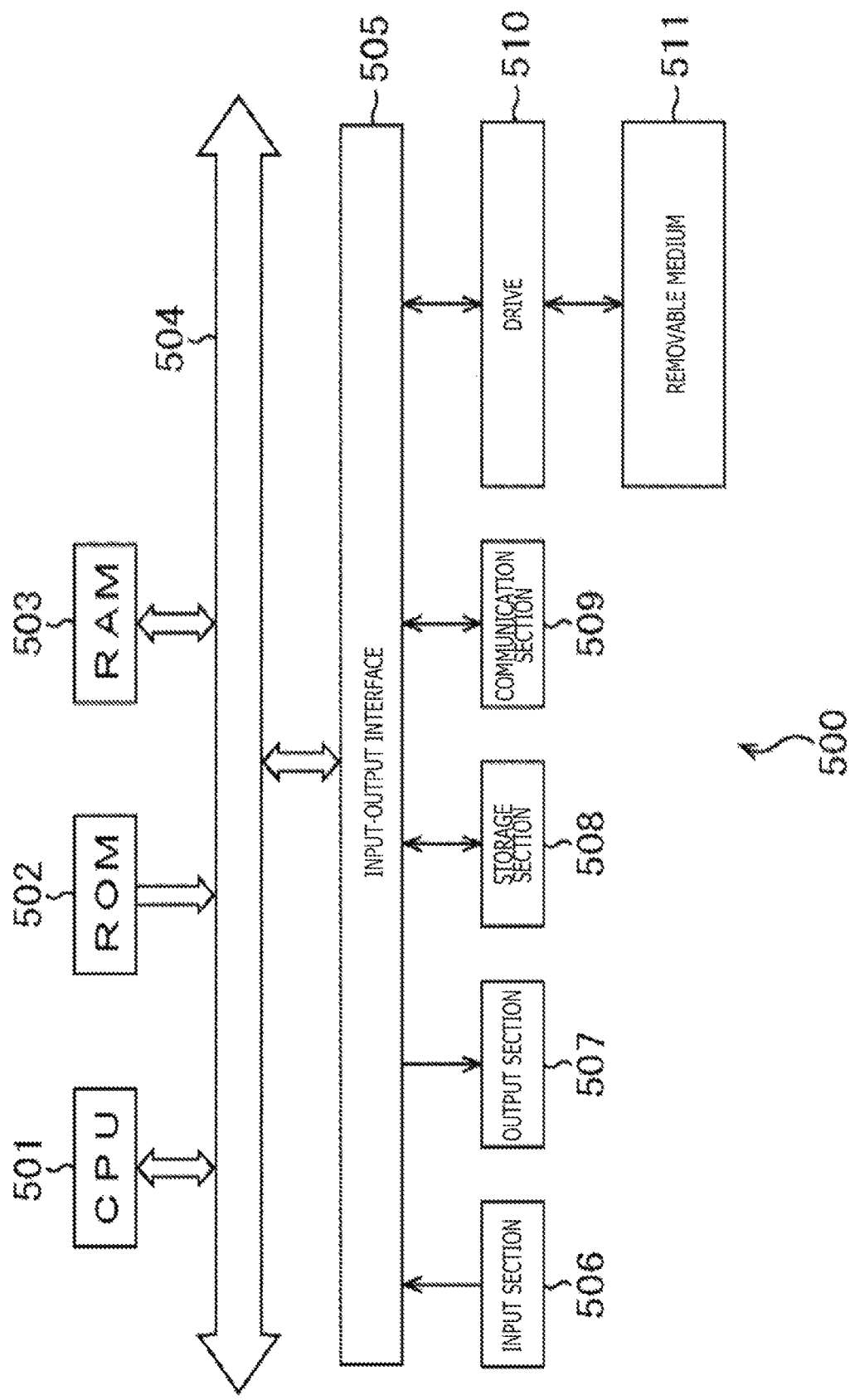

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/026184 filed on Jul. 20, 2017, which claims priority benefit of Japanese Patent Application No. JP 2016-152526 filed in the Japan Patent Office on Aug. 3, 2018. Each of the above-referenced applications is hereby incorporated herein by reference in its entirety.

TECHNICAL FIELD

The present disclosure relates to an image processing apparatus and an image processing method, and particularly, to an image processing apparatus and an image processing method that can use an omnidirectional image to generate a texture image of high picture quality from a predetermined viewpoint.

BACKGROUND ART

There is a storage apparatus that generates an omnidirectional image by mapping, on a 2D image (plane image), photographed images of 360 degrees in a horizontal direction and 180 degrees in a vertical direction photographed by a multi-camera and that encodes and stores the omnidirectional image (for example, see PTL 1).

There is also a reproduction apparatus that decodes an encoded stream of an omnidirectional image stored in a storage apparatus and that uses the omnidirectional image obtained as a result of the decoding to display a texture image in a field-of-view range of a viewer. The reproduction apparatus pastes the omnidirectional image on the surface of a 3D model, such as a sphere and a cube, and displays the texture image in the field-of-view range of the viewer in which the surface of the 3D model in a line-of-sight direction of the viewer is viewed from a viewpoint that is a point inside the 3D model. This reproduces the photographed image in the field-of-view range of the viewer from a predetermined viewpoint.

CITATION LIST

Patent Literature

[PTL 1]
Japanese Patent Laid-Open No. 2006-14174

SUMMARY

Technical Problem

However, a subject may not be sufficiently expressed in the texture image in a case where, for example, a range of brightness of the subject is wide.

The present disclosure has been made in view of the circumstances, and the present disclosure enables to use an omnidirectional image to generate a texture image of high picture quality from a predetermined viewpoint.

Solution to Problem

A first aspect of the present disclosure provides an image processing apparatus including an image generating section that generates a display image from a predetermined viewpoint by using a texture image and a depth image of a first layer including a texture image and a depth image of an omnidirectional image and using a texture image and a depth image of a second layer in which a range of information indicated by a pixel value is different from at least one of the texture image or the depth image of the first layer.

The first aspect of the present disclosure provides an image processing method executed by an image processing apparatus, the method including the step of generating a display image from a predetermined viewpoint by using a texture image and a depth image of a first layer including a texture image and a depth image of an omnidirectional image and using a texture image and a depth image of a second layer in which a range of information indicated by a pixel value is different from at least one of the texture image or the depth image of the first layer.

In the first aspect of the present disclosure, the display image from the predetermined viewpoint is generated by using the texture image and the depth image of the first layer including the texture image and the depth image of the omnidirectional image and using the texture image and the depth image of the second layer in which the range of the information indicated by the pixel value is different from at least one of the texture image or the depth image of the first layer.

A second aspect of the present disclosure provides an image processing apparatus including an image generating section that generates a texture image and a depth image of a first layer including a texture image and a depth image of an omnidirectional image and generates a texture image and a depth image of a second layer in which a range of information indicated by a pixel value is different from at least one of the texture image or the depth image of the first layer.

The second aspect of the present disclosure provides an image processing method executed by an image processing apparatus, the method including the step of generating a texture image and a depth image of a first layer including a texture image and a depth image of an omnidirectional image and generating a texture image and a depth image of a second layer in which a range of information indicated by a pixel value is different from at least one of the texture image or the depth image of the first layer.

In the second aspect of the present disclosure, the texture image and the depth image of the first layer including the texture image and the depth image of the omnidirectional image are generated, and the texture image and the depth image of the second layer are generated in which the range of the information indicated by the pixel value is different from at least one of the texture image or the depth image of the first layer.

Incidentally, the image processing apparatuses according to the first and second aspects of the present disclosure can be implemented by causing a computer to execute a program.

In addition, the program executed by the computer to implement the image processing apparatuses of the first and second aspects of the present disclosure can be provided by transmitting the program via a transmission medium or by recording the program in a recording medium.

The image processing apparatus may be an independent apparatus or may be an internal block included in one apparatus.

Advantageous Effects of Invention

According to the first aspect of the present disclosure, the omnidirectional image can be used to generate a texture image of high picture quality from a predetermined viewpoint.

According to the second aspect of the present disclosure, the omnidirectional image can be used to generate the images for generating a texture image of high picture quality from a predetermined viewpoint.

Incidentally, the advantageous effects described here may not be limited, and the advantageous effects may be any of the advantageous effects described in the present disclosure.

BRIEF DESCRIPTION OF DRAWINGS

FIG. 9 depicts a configuration example of a table including viewpoint position information and surface information of the first layer.

FIG. 18 is a diagram explaining an example of changing a depth distance in each layer.

FIG. 19 is a block diagram depicting a configuration example of a second embodiment of the image display system according to the present disclosure.

FIG. 21 is a block diagram depicting a configuration example of hardware of a computer.

DESCRIPTION OF EMBODIMENTS

Hereinafter, modes for carrying out the present disclosure (hereinafter, referred to as embodiments) will be described. Incidentally, the embodiments will be described in the following order.

Figure 22:
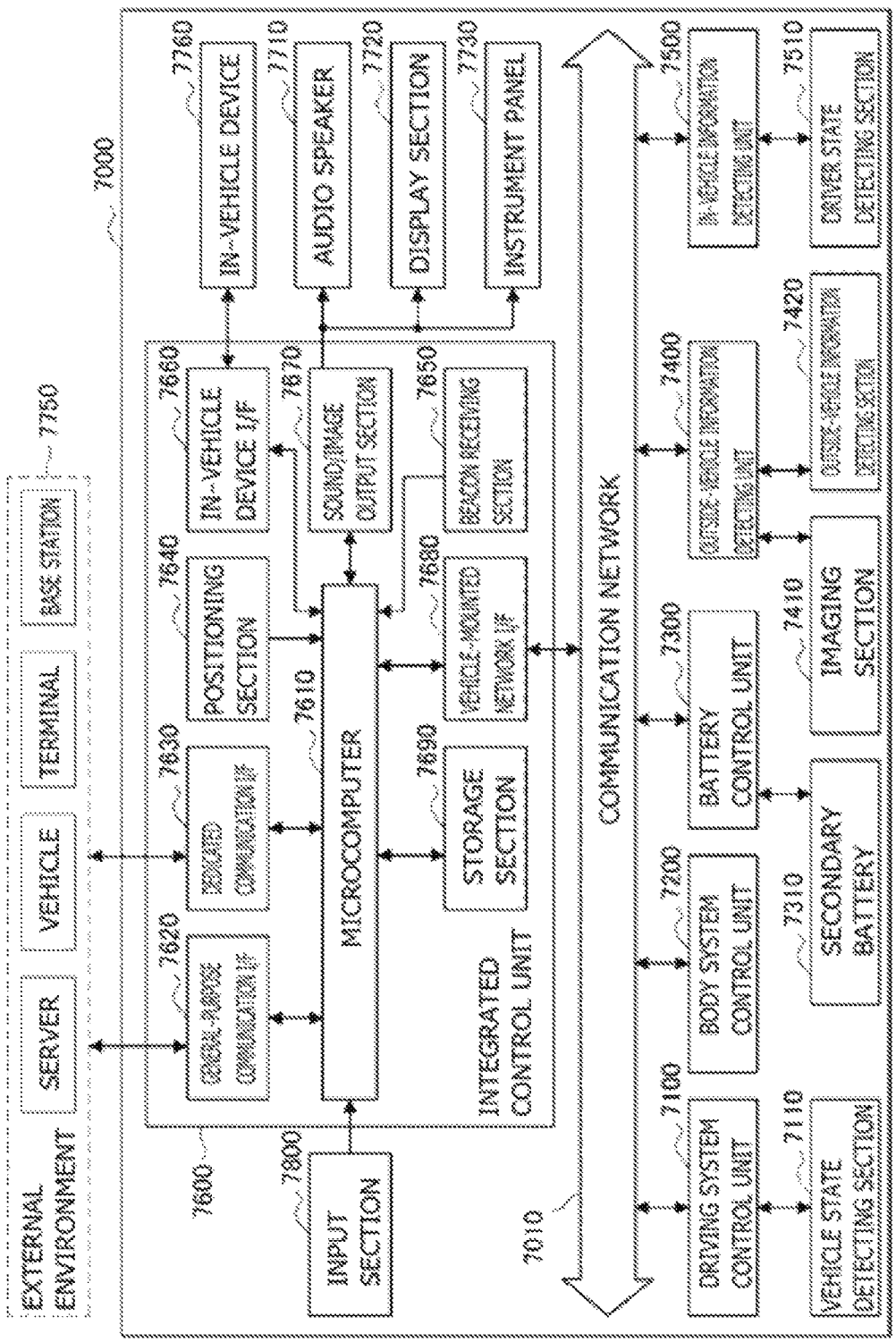
FIG. 22 is a block diagram depicting an example of schematic configuration of a vehicle control system.
Figure 23:
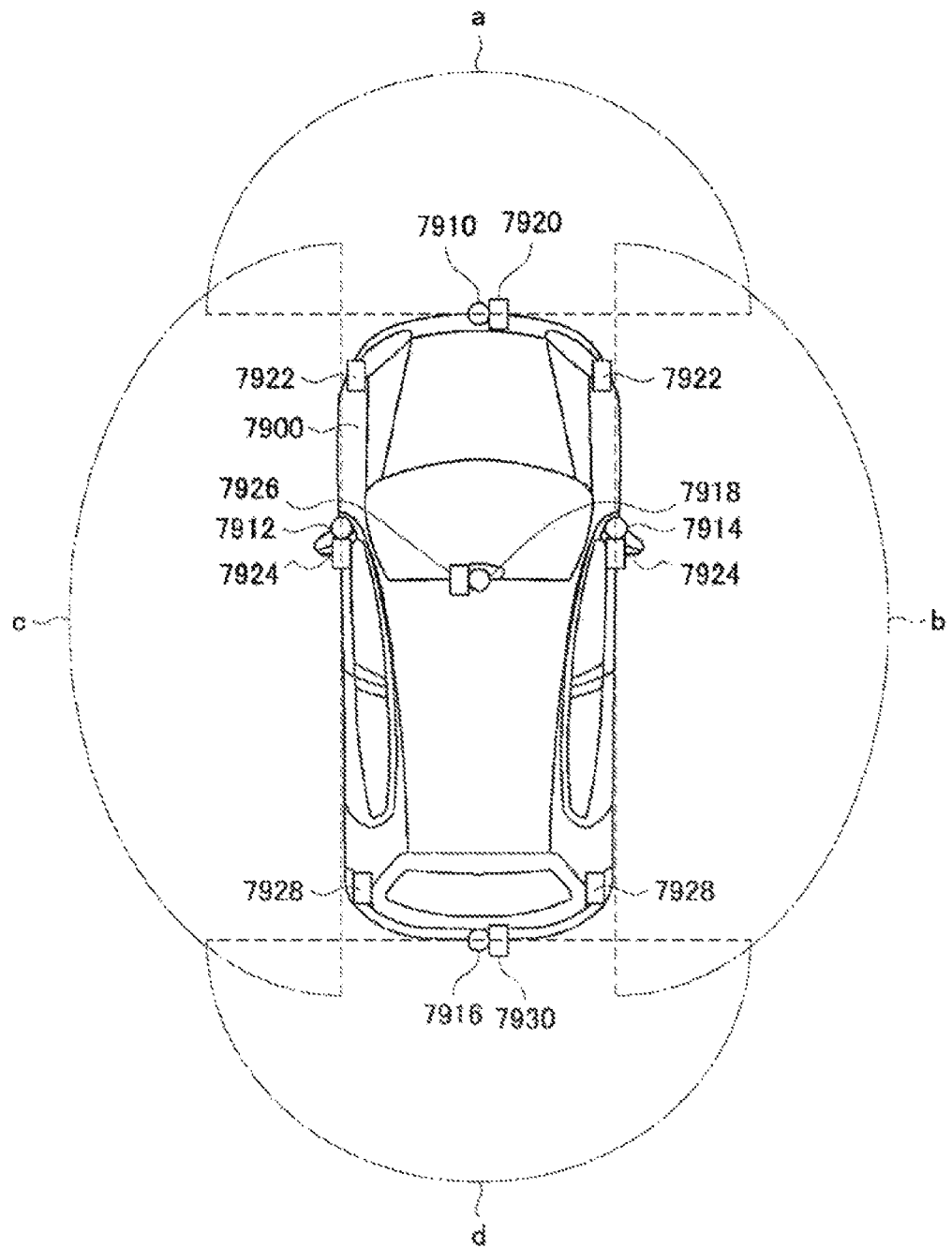
FIG. 23 is a diagram of assistance in explaining an example of installation positions of an outside-vehicle information detecting section and an imaging section.

1. First Embodiment: Image Display System (FIGS. 1, 2, 3, 4A, 4B, 5, 6A, 6B, 7, 8A, 8B, 9, 10, 11, 12, 13, 14A, 14B, 15A, 15B, 16, 17, and 18)
2. Second Embodiment: Image Display System (FIG. 19)
3. Other Examples of Texture Image (FIGS. 20A and 20B)
4. Third Embodiment: Computer (FIG. 21)
5. Applications (FIGS. 22 and 23)

1. First Embodiment (Configuration Example of First Embodiment of Image Display System)

Figure 1:
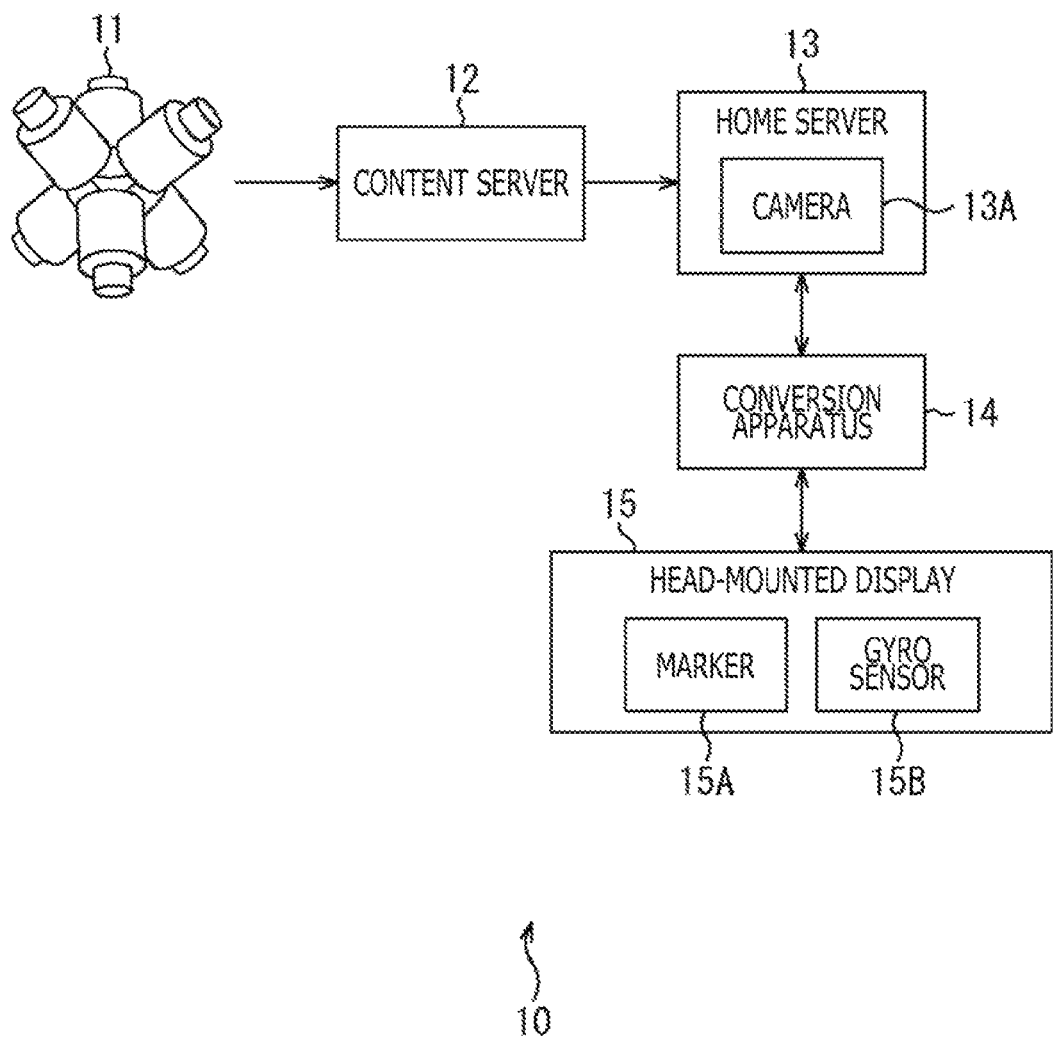
FIG. 1 is a block diagram depicting a configuration example of a first embodiment of an image display system according to the present disclosure.

FIG. 1 is a block diagram depicting a configuration example of a first embodiment of an image display system according to the present disclosure.

An image display system 10 of FIG. 1 includes a multi-camera 11, a content server 12, a home server 13, a conversion apparatus 14, and a head-mounted display 15. The image display system 10 generates an omnidirectional image from photographed images that are YCbCr images (YUV images) photographed by the multi-camera 11 and displays an image in a field-of-view range of a viewer in the omnidirectional image.

Specifically, a photographing range of the multi-camera 11 of the image display system 10 is 360 degrees in a horizontal direction and 180 degrees in a vertical direction, and the multi-camera 11 includes a plurality of (six in the example of FIG. 1) cameras arranged to face outward. Each camera includes a stereo camera including two or more imaging sensors (CMOS image sensors or CCD image sensors) arranged at predetermined intervals in at least one of the horizontal direction or the vertical direction. Each camera performs photographing and generates frames of photographed images obtained as a result of the photographing. The multi-camera 11 supplies the photographed images of each camera to the content server 12. Incidentally, a sensor represented by a ToF (Time of Flight) sensor that can sense image information and distance information may be used as each camera of the multi-camera 11.

The content server 12 (image processing apparatus) generates a texture image and a depth image of the omnidirectional image from a predetermined viewpoint from the photographed images of each camera supplied from the multi-camera 11. In the first embodiment, the depth image is an image with pixel values of 8 bits indicating a distance r of a straight line from the predetermined viewpoint to a subject in each pixel, in which the pixel value is a reciprocal 1/r of the distance r. The distance r of the straight line to the subject can be calculated by using the principle of triangulation based on the parallax in images of the same subject photographed by two or more imaging sensors included in the stereo camera. Incidentally, the distance r of the straight line to the subject may be calculated by using a method other than the method of obtaining the distance r from the parallax, such as a ToF (Time of Flight) system.

In addition, the content server 12 uses the photographed images of the cameras to layer and generate texture images and depth images corresponding to six surfaces of a cube around the viewpoint in the omnidirectional image. More specifically, the content server 12 generates texture images and depth images of a first layer and a second layer of six surfaces. Here, the texture image of the first layer and the texture image of the second layer are generated such that luminance information (Y components) of the YCbCr image (YUV image) photographed by the multi-camera 11 varies between the images.

That is, for example, the aperture is changed, or the exposure time (shutter speed) is changed in each camera of the multi-camera 11 to generate two types of photographed images obtained by taking images from the same viewpoint and in the same field-of-view range, such that the brightness of the subject varies between the images. Each camera supplies the photographed images to the content server 12. The content server 12 generates texture images and depth images of the first layer of the six surfaces from the texture image and the depth image of the omnidirectional image based on the photographed images taken such that the range of the brightness of the subject is in a first range (hereinafter, referred to as first brightness range). The content server 12 also generates texture images and depth images of the second layer of the six surfaces from the texture image and the depth image of the omnidirectional image based on the photographed images taken such that the range of the brightness of the subject is in a second range (hereinafter, referred to as second brightness range) brighter than the first range. Incidentally, the viewpoint in the omnidirectional image and the center of the cube may be different.

The content server 12 uses an encoding system, such as AVC and HEVC, to compress and encode a first layer image including the texture image and the depth image of the first layer of each surface and a second layer image including the texture image and the depth image of the second layer of each surface according to the surface, the type of image, and the layer. The content server 12 stores an encoded stream of the texture image of the first layer (hereinafter, referred to as first layer texture stream), an encoded stream of the depth image of the first layer (hereinafter, referred to as first layer depth stream), an encoded stream of the texture image of the second layer (hereinafter, referred to as second layer texture stream), and an encoded stream of the depth image of the second layer (hereinafter, referred to as second layer depth stream) of each surface obtained as a result of the compression and encoding. Incidentally, the encoding system of the first layer image and the second layer image may be an MVC (Multiview Video Coding) system, a 3D-HEVC system, or the like.

The content server 12 reduces the resolution of the texture image and the depth image of the omnidirectional image to generate a low-resolution texture image and a low-resolution depth image. The content server 12 uses an encoding system, such as AVC (Advanced Video Coding) and HEVC (High Efficiency Video Coding)/H.265, to compress and encode the low-resolution texture image and the low-resolution depth image. The content server 12 stores an encoded stream of the low-resolution texture image (hereinafter, referred to as low-resolution texture stream) and an encoded stream of the low-resolution depth image (hereinafter, referred to as low-resolution depth stream) obtained as a result of the compression and encoding. Incidentally, the low-resolution texture image and the low-resolution depth image may be generated from the texture image and the depth image of the omnidirectional image based on the photographed images with the brightness of the subject in the first range or may be generated from the texture image and the depth image of the omnidirectional image based on the photographed image in the second range. Alternatively, the low-resolution texture image and the low-resolution depth image may be generated from the texture image and the depth image of the omnidirectional image based on a photographed image obtained by averaging the photographed image in the first range and the photographed image in the second range.

The content server 12 further generates and stores metadata of information or the like regarding each surface of the first layer and the second layer. The content server 12 transmits the stored low-resolution texture stream and low-resolution depth stream, the first layer texture streams, the first layer depth streams, the second layer texture streams, and the second layer depth streams of the six surfaces, and the metadata to the home server 13 via a network not illustrated.

Incidentally, the content server 12 can also reconstruct the first layer texture streams, the first layer depth streams, the second layer texture streams, and the second layer depth streams of the six surfaces (details will be described later). In this case, the content server 12 can also transmit the first layer texture streams, the first layer depth streams, the second layer texture streams, and the second layer depth streams after the reconstruction and the metadata corresponding to the streams to the home server 13. However, for the convenience of description, the first layer texture streams, the first layer depth streams, the second layer texture streams, and the second layer depth streams of the six surfaces before the reconstruction are transmitted to the content server 12 even in the case where the streams are reconstructed.

The home server 13 (image processing apparatus) receives the low-resolution texture stream and the low-resolution depth stream, the first layer texture streams, the first layer depth streams, the second layer texture streams, and the second layer depth streams of the six surfaces, and the metadata transmitted from the content server 12.

In addition, the home server 13 includes a camera 13A and photographs a marker 15A attached to the head-mounted display 15 mounted on the head of the viewer. The home server 13 then detects a viewing position on the basis of the photographed image of the marker 15A. The home server 13 further receives a detection result of a gyro sensor 15B of the head-mounted display 15 from the head-mounted display 15 via the conversion apparatus 14. The home server 13 determines a line-of-sight direction of the viewer on the basis of the detection result of the gyro sensor 15B and determines a field-of-view range of the viewer on the basis of the viewing position and the line-of-sight direction.

The home server 13 selects three surfaces corresponding to the line-of-sight direction of the viewer among the six surfaces of the first layer. The home server 13 then decodes the first layer texture streams, the first layer depth streams, the second layer texture streams, and the second layer depth streams corresponding to the three selected surfaces. In this way, the home server 13 generates the texture images and the depth images of the first and second layers corresponding to the three selected surfaces.

The home server 13 also decodes the low-resolution texture stream and the low-resolution depth stream to generate a low-resolution texture image and a low-resolution depth image. The home server 13 uses the texture images and the depth images of the first and second layers corresponding to the three selected surfaces as well as the low-resolution texture image and the low-resolution depth image to generate a display image that is an image of the field-of-view range of the viewer. The home server 13 transmits the display image to the conversion apparatus 14 via an HDMI (registered trademark) (High-Definition Multimedia Interface) cable not illustrated.

The conversion apparatus 14 converts coordinates in the display image transmitted from the home server 13 into coordinates in the head-mounted display 15. The conversion apparatus 14 supplies the display image after the coordinate conversion to the head-mounted display 15.

The head-mounted display 15 includes the marker 15A and the gyro sensor 15B and is mounted on the head of the viewer. The head-mounted display 15 displays the display image supplied from the conversion apparatus 14. In addition, the gyro sensor 15B built in the head-mounted display 15 detects a tilt of the head-mounted display 15 and transmits the detection result to the home server 13 via the conversion apparatus 14.

(Configuration Example of Content Server)

Figure 2:
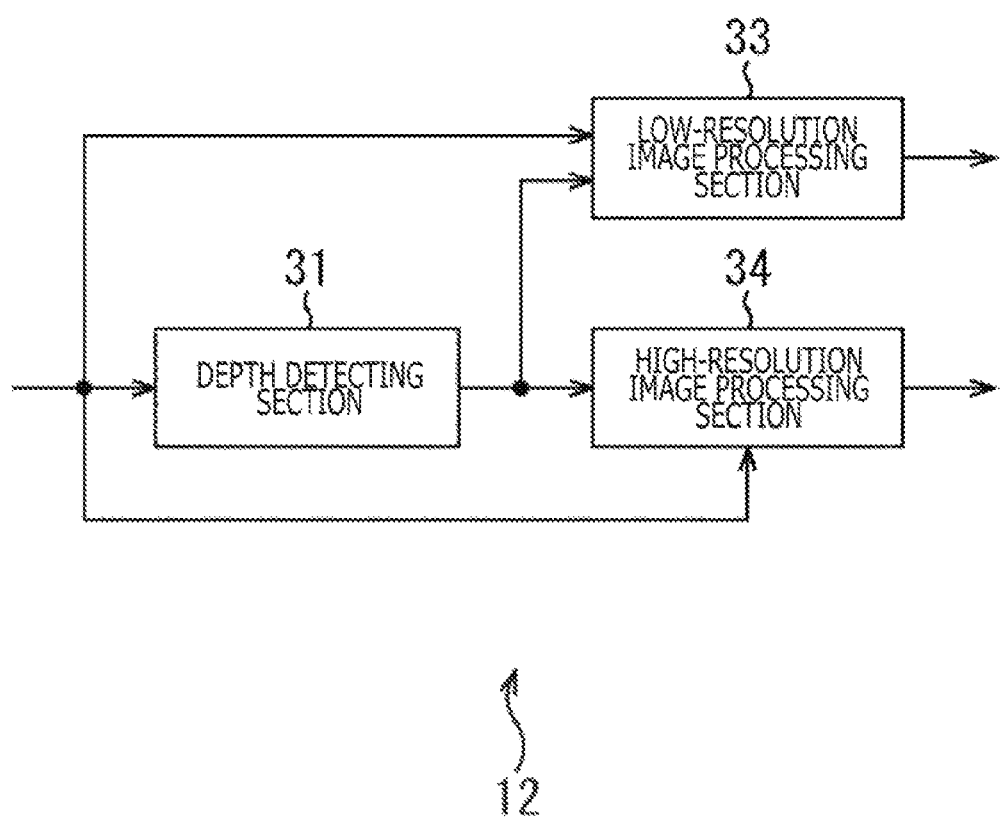
FIG. 2 is a block diagram depicting a configuration example of a content server.

FIG. 2 is a block diagram depicting a configuration example of the content server 12 of FIG. 1.

The content server 12 of FIG. 2 includes a depth detecting section 31, a low-resolution image processing section 33, and a high-resolution image processing section 34.

The depth detecting section 31 of the content server 12 detects a reciprocal 1/z of a distance z for each pixel of the photographed image of each camera supplied from the multi-camera 11 of FIG. 1, in which the distance z is a distance in the depth direction between a depth plane perpendicular to the depth direction including the subject in the pixel and the camera. The depth detecting section 31 supplies a z-image including pixel values that are the reciprocals 1/z of the pixels of the photographed image of each camera obtained as a result of the detection to the low-resolution image processing section 33 and the high-resolution image processing section 34.

The low-resolution image processing section 33 generates the texture image of the omnidirectional image by setting a predetermined three-dimensional position in a three-dimensional coordinate system of the multi-camera 11 (hereinafter, referred to as camera coordinate system) as a viewpoint and mapping (perspective projection) the photographed image of each camera supplied from the multi-camera 11 on a regular octahedron around the viewpoint. The low-resolution image processing section 33 also generates a z-image of the omnidirectional image by mapping the z-image of each camera supplied from the depth detecting section 31 on the regular octahedron as in the case of the photographed image.

The low-resolution image processing section 33 converts the reciprocal 1/z of each pixel of the z-image of the omnidirectional image into the reciprocal 1/r. The low-resolution image processing section 33 then uses the following Equation (1) to perform 8-bit quantization of the reciprocal 1/r.

[Math. 1]

$$I_d(r) = \text{round}\left[255\left(\frac{1}{r} - \frac{1}{r_{max}}\right)\Big/\left(\frac{1}{r_{min}} - \frac{1}{r_{max}}\right)\right] \quad (1)$$

Incidentally, $I_d(r)$ is a value of the reciprocal 1/r of the distance r after the 8-bit quantization. In addition, $r_{max}$ and $r_{min}$ denote a maximum value and a minimum value of the distance r in the photographed images of all cameras, respectively.

The low-resolution image processing section 33 generates the depth image of the omnidirectional image by using the values of the reciprocals 1/r of the pixels of the omnidirectional image after the 8-bit quantization as pixel values.

The low-resolution image processing section 33 reduces the resolution of the texture image and the depth image of the omnidirectional image to generate the low-resolution texture image and the low-resolution depth image. The low-resolution image processing section 33 compresses and encodes the low-resolution texture image and the low-resolution depth image and stores the low-resolution texture stream and the low-resolution depth stream obtained as a result of the compression and encoding. The low-resolution image processing section 33 transmits the stored low-resolution texture stream and low-resolution depth stream to the home server 13 of FIG. 1.

The high-resolution image processing section 34 uses the photographed images of the cameras supplied from the multi-camera 11 to generate the texture images of the first and second layers corresponding to the six surfaces of the cube with the same center as the center of the regular octahedron in the low-resolution image processing section 33. The high-resolution image processing section 34 uses the z-images of the cameras supplied from the depth detecting section 31 to generate the depth images of the first and second layers corresponding to the six surfaces as in the case of the photographed images.

The high-resolution image processing section 34 compresses and encodes the texture images and the depth images of the first and second layers of each surface according to the surface, the type of image, and the layer. The content server 12 stores the first layer texture streams, the first layer depth streams, the second layer texture streams, and the second layer depth streams obtained as a result of the compression and encoding.

The high-resolution image processing section 34 also generates and stores the metadata. The content server 12 transmits the stored first layer texture streams, the first layer depth streams, the second layer texture streams, and the second layer depth streams of the six surfaces and the metadata to the home server 13 via a network not illustrated.

(Configuration Example of High-Resolution Image Processing Section)

Figure 3:
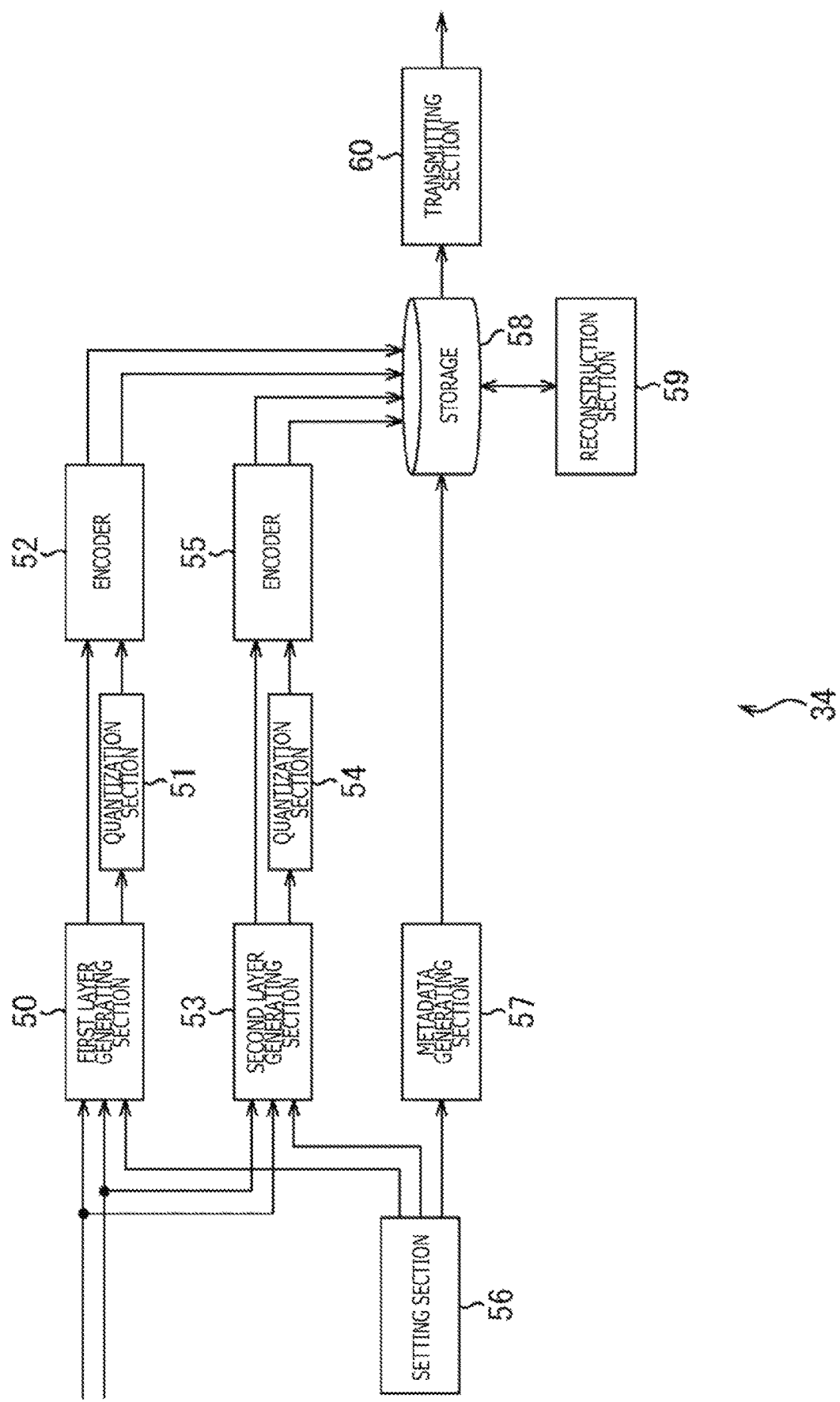
FIG. 3 is a block diagram depicting a configuration example of a high-resolution image processing section.

FIG. 3 is a block diagram depicting a configuration example of the high-resolution image processing section 34 of FIG. 2.

The high-resolution image processing section 34 of FIG. 3 includes a first layer generating section 50, a quantization section 51, an encoder 52, a second layer generating section 53, a quantization section 54, an encoder 55, a setting section 56, a metadata generating section 57, a storage 58, a reconstruction section 59, and a transmitting section 60.

The first layer generating section 50 receives viewpoint position information from the setting section 56, in which the viewpoint position information indicates an origin as a three-dimensional position of the viewpoint of the first layer in a three-dimensional coordinate system (hereinafter, referred to as 3D model coordinate system) with an origin at the viewpoint of the omnidirectional image in the camera coordinate system. The first layer generating section 50 also receives surface information of each of the six surfaces including each of the six surfaces of the cube around the origin in the 3D model coordinate system, in which the surface information indicates the three-dimensional position and the size in the 3D model coordinate system.

The first layer generating section 50 sets the origin indicated in the viewpoint position information as a viewpoint of the first layer (first viewpoint). The first layer generating section 50 (image generating section) uses the viewpoint of the omnidirectional image in the camera coordinate system as the origin and maps the photographed image in the first brightness range supplied from the multi-camera 11 of FIG. 1 on each surface at the three-dimensional position and the size indicated in each of the six pieces of surface information from the viewpoint of the first layer. In this way, the first layer generating section 50 generates the texture images of the six surfaces of the first layer.

The first layer generating section 50 (image generating section) also uses the viewpoint of the omnidirectional image in the camera coordinate system as the origin and maps the z-image supplied from the depth detecting section 31 of FIG. 2 on each surface in the three-dimensional position and the size indicated in each of the six pieces of surface information from the viewpoint of the first layer. In this way, the first layer generating section 50 generates the z-images of the six surfaces of the first layer.

Since the same viewpoint corresponds to the six surfaces of the first layer, it can be stated that the texture images of the six surfaces of the first layer are images obtained by mapping, on the six surfaces, the omnidirectional image mapped on the 3D model around the viewpoint of the first layer. Similarly, it can be stated that the z-images of the six surfaces of the first layer are images obtained by mapping, on the six surfaces, the z-images of the omnidirectional image mapped on the 3D model around the viewpoint of the first layer. The first layer generating section 50 supplies the texture images of the six surfaces of the first layer to the encoder 52 and supplies the z-images of the six surfaces of the first layer to the quantization section 51.

The quantization section 51 converts the reciprocal 1/z of each pixel of the z-image of each of the six surfaces of the first layer supplied from the first layer generating section 50 into the reciprocal 1/r. The quantization section 51 then uses Equation (1) to perform the 8-bit quantization of the reciprocal 1/r. Here, $r_{max}$ and $r_{min}$ in Equation (1) denote the maximum value and the minimum value of the distance r in all of the six surfaces. Setting $r_{max}$ and $r_{min}$ as the maximum value and the minimum value of the distance r in all of the six surfaces can prevent the quantization step from being changed for each surface compared to the case in which $r_{max}$ and $r_{min}$ are set as the maximum value and the minimum value of the distance r of each surface. The quantization section 51 generates the depth images of the six surfaces of the first layer by using the pixel values that are the values after the 8-bit quantization of the reciprocals 1/r of the pixels of the z-images of the six surfaces of the first layer and supplies the depth images to the encoder 52.

The encoder 52 compresses and encodes the texture images of the six surfaces of the first layer supplied from the first layer generating section 52 and the depth images of the six surfaces of the first layer supplied from the quantization section 51 according to the surface and the type of image and generates the first layer texture streams and the first layer depth streams. The encoder 52 supplies the first layer texture streams and the first layer depth streams to the storage 58.

The second layer generating section 53 receives, from the setting section 56, viewpoint position information indicating the same viewpoint (viewpoint of second layer) as the viewpoint of the first layer in each surface of the second layer corresponding to each surface of the first layer and surface information of each surface of the second layer corresponding to each surface of the first layer.

For each surface of the second layer, the second layer generating section 53 (image generating section) maps the photographed image in the second brightness range supplied from the multi-camera 11 on each surface at the three-dimensional position and the size indicated in each of the six pieces of surface information from the viewpoint of the second layer corresponding to the surface. In this way, the second layer generating section 53 generates the texture images of the six surfaces of the second layer.

In addition, for each surface of the second layer, the second layer generating section 53 (image generating section) maps the z-image supplied from the depth detecting section 31 of FIG. 2 on each surface at the three-dimensional position and the size indicated in each of the six pieces of surface information from the viewpoint of the second layer. In this way, the second layer generating section 54 generates the z-images of the six surfaces of the second layer.

Therefore, although the brightness of the subject indicated by the pixel values of the texture image varies between the texture image of the first layer and the texture image of the second layer, the distance to the subject indicated by the z-image is the same in the z-image of the first layer and the z-image of the second layer. The second layer generating section 53 supplies the texture images of the six surfaces of the second layer to the encoder 55 and supplies the z-images of the six surfaces of the second layer to the quantization section 54.

The quantization section 54 converts the reciprocal 1/z of each pixel of the z-image of each of the six surfaces of the second layer supplied from the second layer generating section 53 into the reciprocal 1/r. The quantization section 54 then uses Equation (1) to perform the 8-bit quantization of the reciprocal 1/r in a manner similar to the quantization section 51. The quantization section 54 generates the depth images of the six surfaces of the second layer by using the pixel values that are the values after the 8-bit quantization of the reciprocals 1/r of the pixels of the z-images of the six surfaces of the second layer and supplies the depth images to the encoder 55.

The encoder 55 compresses and encodes the texture images of the six surfaces of the second layer supplied from the second layer generating section 53 and the depth images of the six surfaces of the second layer supplied from the quantization section 54 according to the surface and the type of image and generates the second layer texture streams and the second layer depth streams. The encoder 55 supplies the second layer texture streams and the second layer depth streams to the storage 58.

The setting section 56 sets the origin in the 3D model coordinate system as the viewpoint of the first layer. The setting section 56 sets the six surfaces including six rectangular surfaces of the cube around the viewpoint of the first layer as the surfaces of the first layer.

The setting section 56 supplies one piece of viewpoint position information and six pieces of surface information of the first layer to the first layer generating section 50 and the metadata generating section 57. The setting section 56 also supplies the viewpoint position information and six pieces of surface information from the same viewpoint as the viewpoint of the first layer to the second layer generating section 53.

The metadata generating section 57 generates metadata of a table including the viewpoint position information and the surface information common to the first and second layers supplied from the setting section 56 and supplies the metadata to the storage 58.

The storage 58 stores the first layer texture streams and the first layer depth streams supplied from the encoder 52 and the second layer texture streams and the second layer depth streams supplied from the encoder 55. The storage 58 also stores the metadata supplied from the metadata generating section 57.

The storage 58 also stores the first layer texture streams, the first layer depth streams, the second layer texture streams, and the second layer depth streams after the reconstruction and the metadata supplied from the reconstruction section 59.

The reconstruction section 59 reads and reconstructs the first layer texture streams, the first layer depth streams, the second layer texture streams, and the second layer depth streams of the six surfaces stored in the storage 58 as necessary.

Specifically, the reconstruction section 59 uses the first layer texture streams before the reconstruction to change the number of surfaces and the angles of view corresponding to the first layer texture streams and uses the first layer depth streams before the reconstruction to change the number of surfaces and the angles of view corresponding to the first layer depth streams. For example, the reconstruction section 59 changes the surfaces of the first layer from six surfaces including the six surfaces of the cube to 18 surfaces including the six surfaces and 12 surfaces in which the normal lines passing through the centers of the surfaces are lines passing through the midpoints of 12 sides of the cube and the viewpoint.

Alternatively, the reconstruction section 59 uses the first layer texture streams before the reconstruction to change the intervals (density) between the surfaces corresponding to the first layer texture streams and uses the first layer depth streams before the reconstruction to change the intervals between the surfaces corresponding to the first layer depth streams. For example, the reconstruction section 59 changes the surfaces of the first layer from six surfaces including the six surfaces of the cube, in which the intervals between the normal lines passing through the centers are 90 degrees, to 18 surfaces, in which the intervals between the normal lines passing through the centers are 45 degrees.

When the intervals between the surfaces of the first layer are narrow, the number of surfaces increases, and the total data capacity increases. However, the home server 13 can generate a display image by using the texture image and the depth image corresponding to the surface of the first layer closer to the field-of-view range of the viewer. This increases a high-resolution area in the display image generated by using the texture image and the depth image of the first layer or the second layer and improves the image quality of the display image.

Incidentally, the reconstruction section 59 may use the first layer texture streams before the reconstruction to change the positions of the surfaces corresponding to the first layer texture streams and use the first layer depth streams before the reconstruction to change the positions of the surfaces corresponding to the first layer depth streams to thereby perform the reconstruction. In this case, when, for example, the main subject is at the boundary of the surfaces of the first layer, the reconstruction section 59 performs the reconstruction by rotating the cube corresponding to the six surfaces of the first layer so that the main subject is at a position (for example, center) other than the boundary of the surfaces of the first layer.

In addition, the reconstruction section 59 may use the first layer texture streams before the reconstruction to change the tilts of the surfaces corresponding to the first layer texture streams and use the first layer depth streams before the reconstruction to change the tilts of the surfaces corresponding to the first layer depth streams to thereby perform the reconstruction. In this case, when, for example, the main subject in the texture image of the first layer is tilted, the reconstruction section 59 performs the reconstruction by rotating the cube corresponding to the six surfaces of the first layer so that the main subject is not tilted.

For each surface of the first layer changed in this way, the reconstruction section 59 sets the viewpoint and the surface of the second layer after the reconstruction. The reconstruction section 59 then uses the second layer texture stream before the reconstruction to change the viewpoint and the surface corresponding to the second layer texture stream to the set viewpoint and surface of the second layer after the reconstruction. The reconstruction section 59 also uses the second layer depth stream before the reconstruction to change the viewpoint and the surface corresponding to the second layer depth stream to the set viewpoint and surface of the second layer after the reconstruction.

The reconstruction section 59 supplies the first layer texture streams, the first layer depth streams, the second layer texture streams, and the second layer depth streams after the reconstruction to the storage 58. The reconstruction section 59 also generates metadata of a table including the viewpoint position information and the surface information of the first layer and the viewpoint position information and the surface information of the second layer after the reconstruction and supplies the metadata to the storage 58.

The transmitting section 60 reads the first layer texture streams, the first layer depth streams, the second layer texture streams, and the second layer depth streams of the six surfaces and the metadata from the storage 58 and transmits them to the home server 13 of FIG. 1.

In this way, the high-resolution image processing section 34 of FIG. 3 uses the perspective projection to generate the first layer image and the second layer image. Therefore, the home server 13 can apply a normal process for image to the first layer image and the second layer image. In addition, the high-resolution image processing section 34 can use a normal transmission method of encoded stream of image to transmit the first layer texture streams, the first layer depth streams, the second layer texture streams, and the second layer depth streams.

(Description of Distance z and Distance r)

Figure 4B:
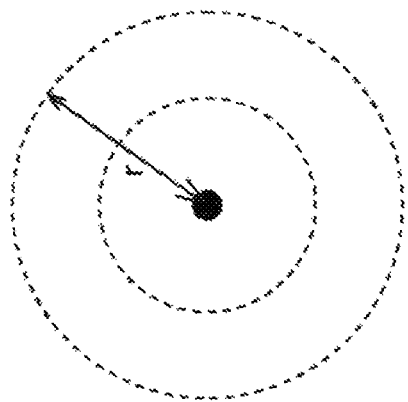
FIGS. 4A and 4B are diagrams explaining a distance z and a distance r.
Figure 4A:
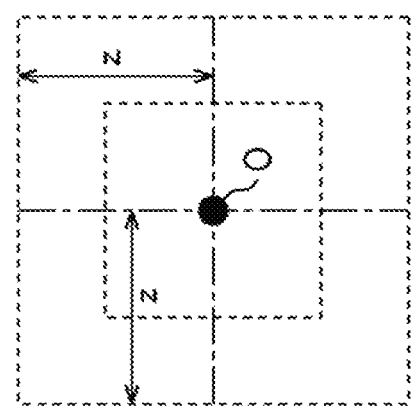

FIGS. 4A and 4B are diagrams explaining the distance z and the distance r.

Incidentally, FIGS. 4A and 4B are top views of a predetermined surface of the cube corresponding to the first layer.

The distance z is a distance in the depth direction from the viewpoint to the depth plane perpendicular to the depth direction including the subject in each pixel. In addition, the depth direction of each surface of the first layer is a direction perpendicular to each surface of the first layer. Therefore, each surface of the first layer and the depth plane are parallel to each other. Thus, the shape of an equidistance z-surface that is a depth plane, in which the distance z is the same in each surface of the first layer, is cubic around a viewpoint O of the first layer. Therefore, the shape of the equidistant z-surface as viewed from above a predetermined surface of the cube corresponding to the first layer is a square as indicated by a dotted line in FIG. 4A.

On the other hand, the distance r is a distance of a straight line from the viewpoint to the subject in each pixel. In addition, the direction of the straight line from the viewpoint O of each surface of the first layer to the subject is a radial direction of a circle around the viewpoint O regardless of the surface. Therefore, the shape of an equidistant r-surface, in which the distance r is the same in each surface of the first layer, is spherical around the viewpoint O of the first layer.

Thus, the shape of the equidistant r-surface as viewed from above a predetermined surface of the cube corresponding to the first layer is circular as indicated by a dotted line in FIG. 4B.

(Description of Advantageous Effects of Depth Image)

Incidentally, three normal vectors orthogonal to each other among normal vectors of six surfaces passing through the viewpoint O of the first layer and passing through the centers of six surfaces of a cube 80 corresponding to the first layer will be regarded as positive directions of an X-axis, a Y-axis, and a Z-axis of the 3D model coordinate system. Three normal vectors in the opposite directions of the three normal vectors will be regarded as negative directions of the X-axis, the Y-axis, and the Z-axis of the 3D model coordinate system.

Figure 5:
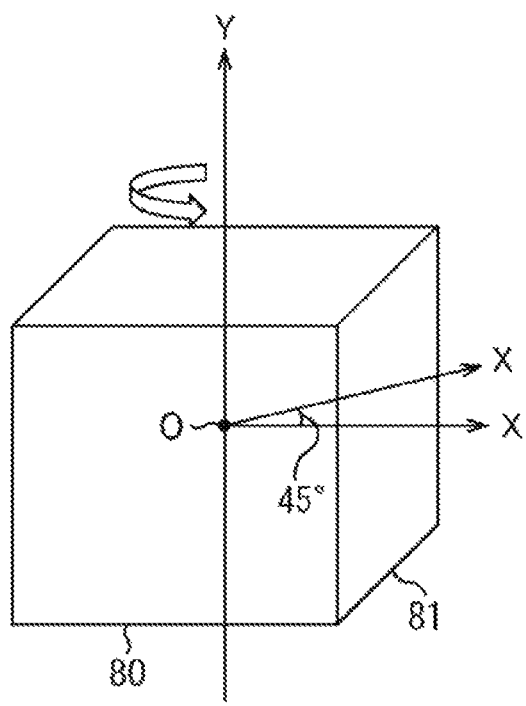
FIG. 5 depicts a change in an X-axis of a 3D model coordinate system.
Figure 6B:
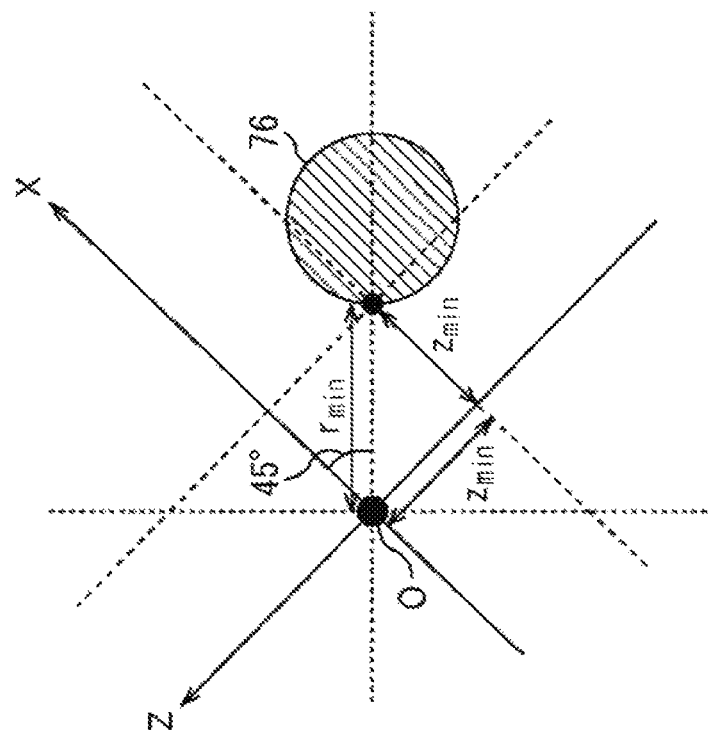
FIGS. 6A and 6B are diagrams explaining changes in a minimum value zmin and a minimum value rmin associated with the change in the X-axis of the 3D model coordinate system.
Figure 6A:
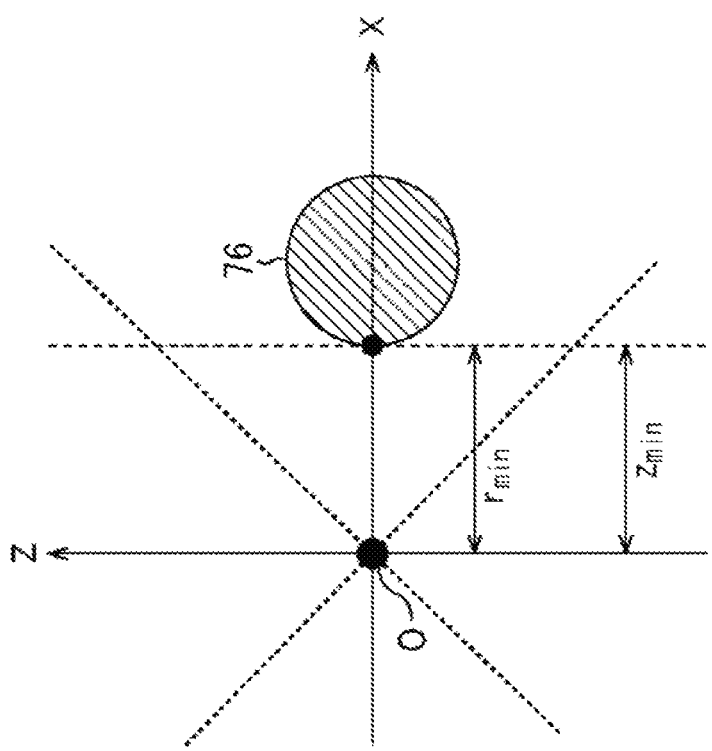

FIG. 5 depicts a change in the X-axis of the 3D model coordinate system, and FIGS. 6A and 6B depict changes in a minimum value zmin and a minimum value rmin associated with the change in the X-axis of the 3D model coordinate system.

Incidentally, the angle of view of each surface of the first layer is 90 degrees in the example of FIGS. 5, 6A and 6B.

In addition, in a case where the cube 80 corresponding to the first layer is rotated 45 degrees about the Y-axis on an XZ-plane, and the position of each surface of the first layer is changed as illustrated in FIG. 5, the X-axis is rotated by 45 degrees on the XZ-plane. As a result, the depth direction of a surface 81 of the first layer with the normal vector in the positive direction of the X-axis is rotated 45 degrees on the XZ-plane.

Therefore, when a sphere 76 as a subject around a position where the X-coordinate is a positive value and the Z-coordinate is 0 is in the angle of view of the surface 81 as illustrated in FIGS. 6A and 6B, the minimum value zmin in the surface 81 before the rotation is, as illustrated in FIG. 6A, a minimum value of the distance between the viewpoint O and the sphere 76 in the positive direction of the X-axis in FIG. 6A. However, the minimum value zmin in the surface 81 after the rotation is, as illustrated in FIG. 6B, a minimum value of the distance between the viewpoint O and the sphere 76 in the angle of view (upper half of the sphere 76 in FIG. 6B) in the positive direction of the X-axis in FIG. 6B.

In addition, a maximum value zmax in the surface 81 before the rotation is infinite in the case of the example of FIGS. 6A and 6B, and the maximum value zmax in the surface 81 after the rotation is also infinite. However, in a case where the maximum value zmax is not infinite, the maximum value zmax in the surface 81 is changed by the rotation for a reason similar to the case of the minimum value zmin. The minimum values zmin and the maximum values zmax are similarly changed in the other surfaces of the first layer.

Although not described, the minimum values $z_{min}$ and the maximum values $z_{max}$ are also changed in all of the surfaces of the first layer in a case where the angles of view, the number, or the intervals of the surfaces of the first layer are changed.

Therefore, when the reciprocal 1/z of the distance z is used as the y-value (luminance value) of each pixel of the depth image of the first layer, the reconstruction section 59 needs to calculate the minimum value $z_{min}$ and the maximum value $z_{max}$ in each surface again to determine the minimum values $z_{min}$ and the maximum values $z_{max}$ in all of the surfaces again in the reconstruction. As a result, the 8-bit quantization of the depth image needs to be performed again.

On the other hand, the direction of the straight line from the viewpoint O to the subject is the same regardless of the position of the surface of the first layer. Therefore, the minimum value $r_{min}$ and the maximum value $r_{max}$ are the same even in the case where the cube 80 is rotated 45 degrees about the Y-axis on the XZ-plane as illustrated in FIG. 5.

That is, as illustrated in FIG. 6B, the direction of the straight line from the viewpoint O to the subject is a direction radially extending from the viewpoint O in a manner similar to before the rotation even when the X-axis in FIG. 6A is rotated 45 degrees on the XZ-plane. Therefore, the minimum value rmin in all of the surfaces of the first layer is a minimum value of the distance of the straight line from the viewpoint O to the sphere 76 regardless of the rotation of the X-axis. The maximum value rmax in all of the surfaces of the first layer is also not changed by the rotation for a reason similar to the case of the minimum value rmin.

Although not described, the direction of the straight line from the viewpoint O to the subject is not changed even in a case where the angles of view, the number, or the intervals of the surfaces of the first layer are changed, and the minimum value $r_{min}$ and the maximum value $r_{max}$ are not changed.

Therefore, the quantization value of the reciprocal 1/r can be used as the y-value of each pixel of the depth image of the first layer instead of the reciprocal 1/z to eliminate the process of performing the 8-bit quantization of the depth image again in the reconstruction by the reconstruction section 59.

Incidentally, although the low-resolution texture stream and the low-resolution depth stream are not reconstructed in the description above, the streams may be reconstructed. In that case, the y-value of each pixel of the low-resolution depth image is also the quantization value of the reciprocal 1/r, and the process of performing the 8-bit quantization of the low-resolution depth image again in the reconstruction can be eliminated as in the case of the reconstruction of the depth image of the first layer.

In addition, the low-resolution texture stream and the low-resolution depth stream may be reconstructed by changing the mapping system of the low-resolution texture stream and the low-resolution depth stream. In this case, the y-value of each pixel of the depth image can also be set to the quantization value of the reciprocal 1/r to eliminate the process of performing the 8-bit quantization of the low-resolution depth image again in the reconstruction.

(Example of Positions of Pixels in Depth Images of Six Surfaces of First Layer on Sphere)

Figure 7:
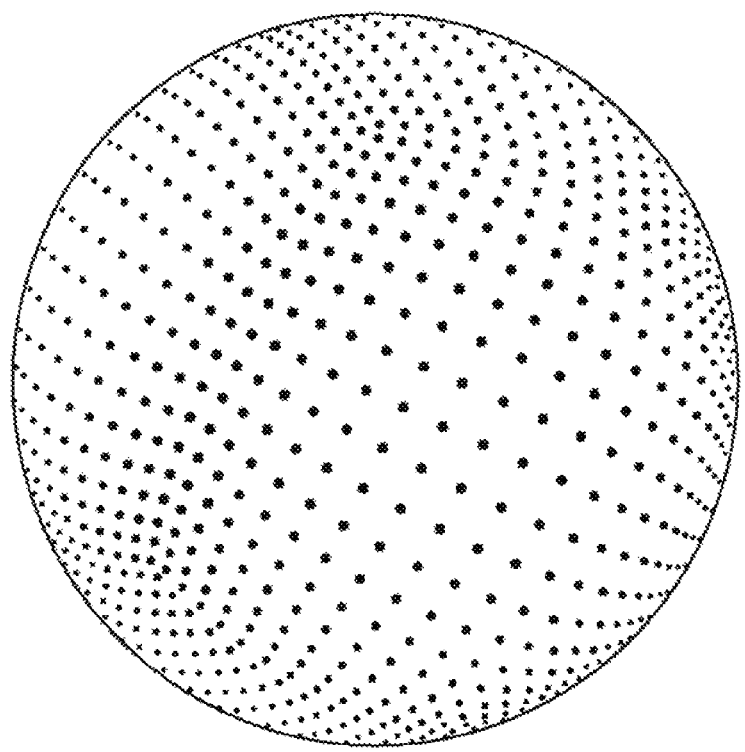
FIG. 7 depicts an example of positions of pixels on a sphere when depth images of six surfaces of a first layer are mapped on the sphere.

FIG. 7 depicts an example of positions of the pixels on the sphere when the depth images of the six surfaces of the first layer are mapped on the sphere.

Incidentally, dots in FIG. 7 represent the positions of the pixels on the sphere when the depth images of the six surfaces of the first layer are mapped on the sphere.

The intervals between the positions of the pixels in the depth images of the surfaces of the first layer are regular intervals on the depth images. However, as illustrated in FIG. 7, the intervals between the positions of the pixels on the sphere are not regular intervals when the depth images of the six surfaces of the first layer are mapped on the sphere. That is, the density of the positions of the pixels on the sphere are not constant when the depth images of the six surfaces of the first layer are mapped on the sphere.

(Example of Surfaces of First Layer)

Figure 8B:
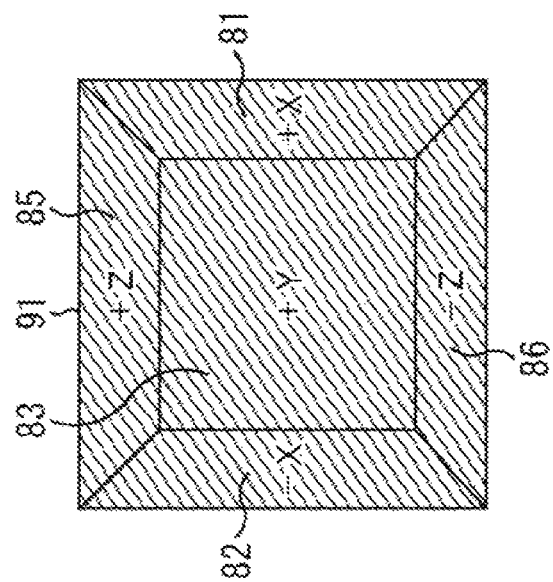
FIGS. 8A and 8B depict an example of surfaces of the first layer.
Figure 8A:
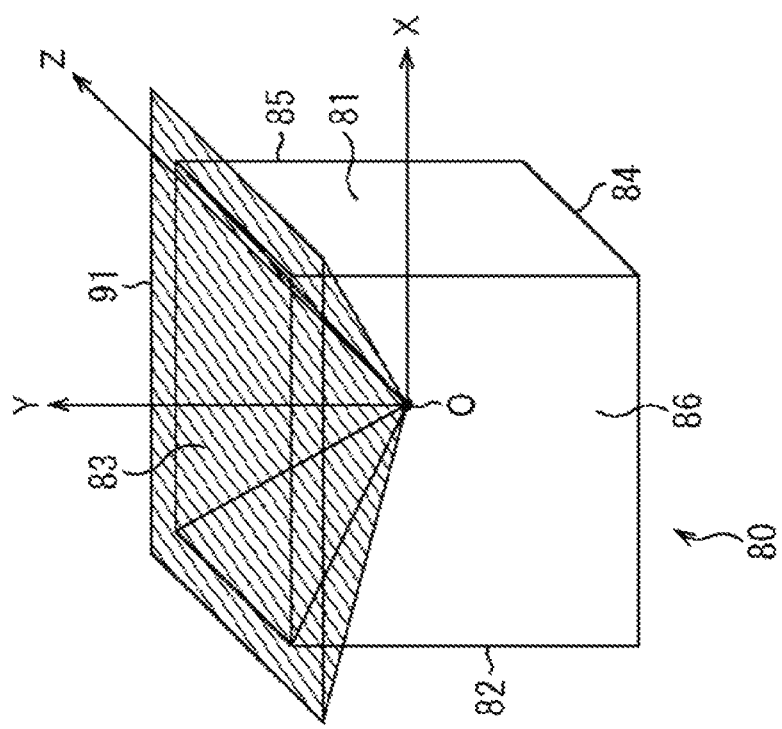

FIGS. 8A and 8B depicts an example of the surfaces of the first layer.

Incidentally, a surface with X=R where R is the distance between the viewpoint O and each of the six surfaces will also be appropriately referred to as a +X surface, and a surface with X=−R will also be appropriately referred to as a −X surface. Similarly, a surface with Y=R, a surface with Y=−r, a surface with Z=R, and a surface with Z=−R will also be appropriately referred to as a +Y surface, a −Y surface, a +Z surface, and a −Z surface.

In addition, FIG. 8A is a perspective view of the cube 80 of the first layer, and FIG. 8B is a view of the cube 80 of the first layer in the negative direction of the Y-axis.

As illustrated in FIG. 8A, one surface 91 of the first layer is a surface including a +Y surface 83 of six surfaces 81 to 86 of the cube 80 around the viewpoint O. More specifically, the surface 91 is a surface set at the same position as the position of the +Y surface 83, and the angle of view in the lateral direction and the longitudinal direction is greater than 90 degrees, which is the angle of view of the +Y surface 83, and smaller than 180 degrees.

Therefore, as illustrated in FIG. 8B, the texture image of the surface 91 includes not only the texture image mapped on the +Y surface 83, but also part of the texture images mapped on the +X surface 81, the −X surface 82, the +Z surface 85, and the −Z surface 86 adjacent to the +Y surface 83. This similarly applies to the depth image of the surface 91 as in the case of the texture image.

Although FIGS. 8A and 8B illustrate only one surface 91 of the first layer, the other five surfaces are also surfaces set at the same positions as the positions of the +X surface 81, the −X surface 82, −Y surface 84, the +Z surface 85, and the −Z surface 86, respectively, and the angle of view in the lateral direction and the longitudinal direction is greater than 90 degrees and smaller than 180 degrees as in the case of the surface 91.

In this way, the six surfaces of the first layer include the six surfaces 81 to 86 of the cube, respectively, and the omnidirectional image is surely mapped on one of the six surfaces of the first layer. Therefore, the home server 13 can use three adjacent surfaces of the six surfaces of the first layer at most to generate a display image in an arbitrary direction of 360 degrees in the horizontal direction and 180 degrees in the vertical direction in which the viewpoint O is the viewing position.

(Configuration Example of Table Including Viewpoint Position Information and Surface Information of First Layer)

FIG. 9 depicts a configuration example of a table including the viewpoint position information and the surface information of the first layer in the metadata generated by the metadata generating section 57 of FIG. 3.

In the example of FIG. 9, the information in the surface information indicating the three-dimensional position in the 3D model coordinate system of the surfaces includes the azimuth, the elevation angle, the rotation angle, and the line-of-sight vector, and the information indicating the size includes the horizontal angle of view and the vertical angle of view.

The azimuth is an angle in the XZ-plane direction formed by a line, which connects the viewpoint and the center of each surface, and the Z-axis, and the elevation angle is an angle formed by the line, which connects the viewpoint and the center of each surface, and the XZ-plane. Here, the positive direction of the azimuth is clockwise, and the positive direction of the elevation angle is counterclockwise. A line in the Z-axis direction extending from the viewpoint is horizontally rotated by an amount equivalent to the azimuth on the XZ-plane, and the line is rotated up and down in the Y-axis direction by an amount equivalent to the elevation angle. The line is the normal line passing through the center of the surface.

The rotation angle is an angle in the rotation direction of each surface rotated about the line connecting the viewpoint and the center of each surface. Here, the positive direction of the rotation angle is clockwise. The line-of-sight vector is a vector in which the length from the viewpoint toward the center of each surface is 1, that is, a normal vector passing through the center of each surface. The horizontal angle of view is an angle formed by lines connecting two edges of each surface in the lateral direction and the viewpoint, and the vertical angle of view is an angle formed by lines connecting two edges of each surface in the longitudinal direction and the viewpoint.

As illustrated in FIG. 9, a common part of a file name of a file storing the first layer texture stream and the first layer depth stream of each surface in the storage 58 of FIG. 3 is registered in the table of the viewpoint position information and the surface information of the first layer.

Specifically, in the example of FIG. 9, the file names of the first layer texture streams of the surfaces including the +Z surface 85, the −Z surface 86, the +X surface 81, the −X surface 82, the +Y surface 83, and the −Y surface 84 are posZ_texture, negZ_texture, posX_texture, negX_texture, posY_texture, and negY_texture, respectively. In addition, the file names of the first depth streams of the surfaces including the +Z surface 85, −Z surface 86, the +X surface 81, the −X surface 82, the +Y surface 83, and the −Y surface 84 are posZ_depth, negZ_depth, posX_depth, negX_depth, posY_depth, and negY_depth, respectively. Therefore, posZ, negZ, posX, negX, posY, and negY are registered as common parts of the file names of the surfaces of the first layer in the table of FIG. 9.

In addition, the surface information of the surface, the viewpoint position information, and the number of horizontal pixels and the number of vertical pixels of the texture image and the depth image corresponding to the common part of the file name are registered in association with the common part of the file name in the table of the viewpoint position information and the surface information of the first layer.

Specifically, the angles in the XZ-plane direction formed by the lines, which connect the viewpoint O and the centers of the surfaces of the first layers including the +Z surface 85, the −Z surface 86, the +X surface 81, the −X surface 82, the +Y surface 83, and the −Y surface 84, and the Z-axis are 0 degrees, −180 degrees, 90 degrees, −90 degrees, 0 degrees, and 0 degrees, respectively. The angles formed by the lines and the XZ-plane are 0 degrees, 0 degrees, 0 degrees, 0 degrees, 90 degrees, and −90 degrees, respectively. Therefore, the azimuths "0 degrees," "−180 degrees," "90 degrees," "−90 degrees," "0 degrees," and "0 degrees" are registered, and the elevation angles "0 degrees," "0 degrees," "0 degrees," "0 degrees," "90 degrees," and "−90 degrees" are registered in association with the common parts "post," "negZ," "posX," "negX," "posY," "negY" of the file names, respectively.

In addition, the rotation angle is 0 degrees in all of the surfaces of the first layer in the example of FIG. 9. Therefore, the rotation angle "0 degrees" is registered in association with the common parts "posZ," "negZ," "posX," "negX," "posY," and "negY" of the file names. Furthermore, the coordinates (0, 0, 0) of the origin are registered as the viewpoint position information in association with the common parts "posZ," "negZ," "posX," "negX," "posY," and "negY" of the file names.

In addition, the line-of-sight vectors of the surfaces of the first layer including the +Z surface 85, the −Z surface 86, the +X surface 81, the −X surface 82, the +Y surface 83, and the −Y surface 84 are (0, 0, 1), (0, 0, −1), (1, 0, 0), 1, 0, 0)(0, 1, 0), and (0, −1, 0) from the viewpoint O, respectively. Therefore, the line-of-sight vectors (0, 0, 1), (0, 0, −1), (1, 0, 0)(−1, 0, 0), (0, 1, 0), and (0, −1, 0) are registered in association with the common parts "posZ," "negZ," "posX," "negX," "posY," and "negY" of the file names, respectively.

Furthermore, in the example of FIG. 9, the horizontal angle of view and the vertical angle of view of all of the surfaces of the first layer are 100 degrees greater than 90 degrees. The number of horizontal pixels that is the number of pixels in the lateral direction of the texture image and the depth image and the number of vertical pixels that is the number of pixels in the longitudinal direction are 1024. Therefore, the horizontal angle of view "100 degrees," the vertical angle of view "100 degrees," the number of horizontal pixels "1024," and the number of vertical pixels "1024" are registered in association with the common parts "post," "negZ," "posX," "negX," "posY," and "negY" of the file names.

In this way, the metadata generating section 57 generates the metadata of the table including the viewpoint position information and the surface information of the first layer. The viewpoint position and the surface information of the second layer are the same as those of the first layer, and the table of the viewpoint position information and the surface information of the first layer is also referenced for the second layer.

(Relationship Between First Brightness Range, Second Brightness Range, and Display image)

Figure 10:
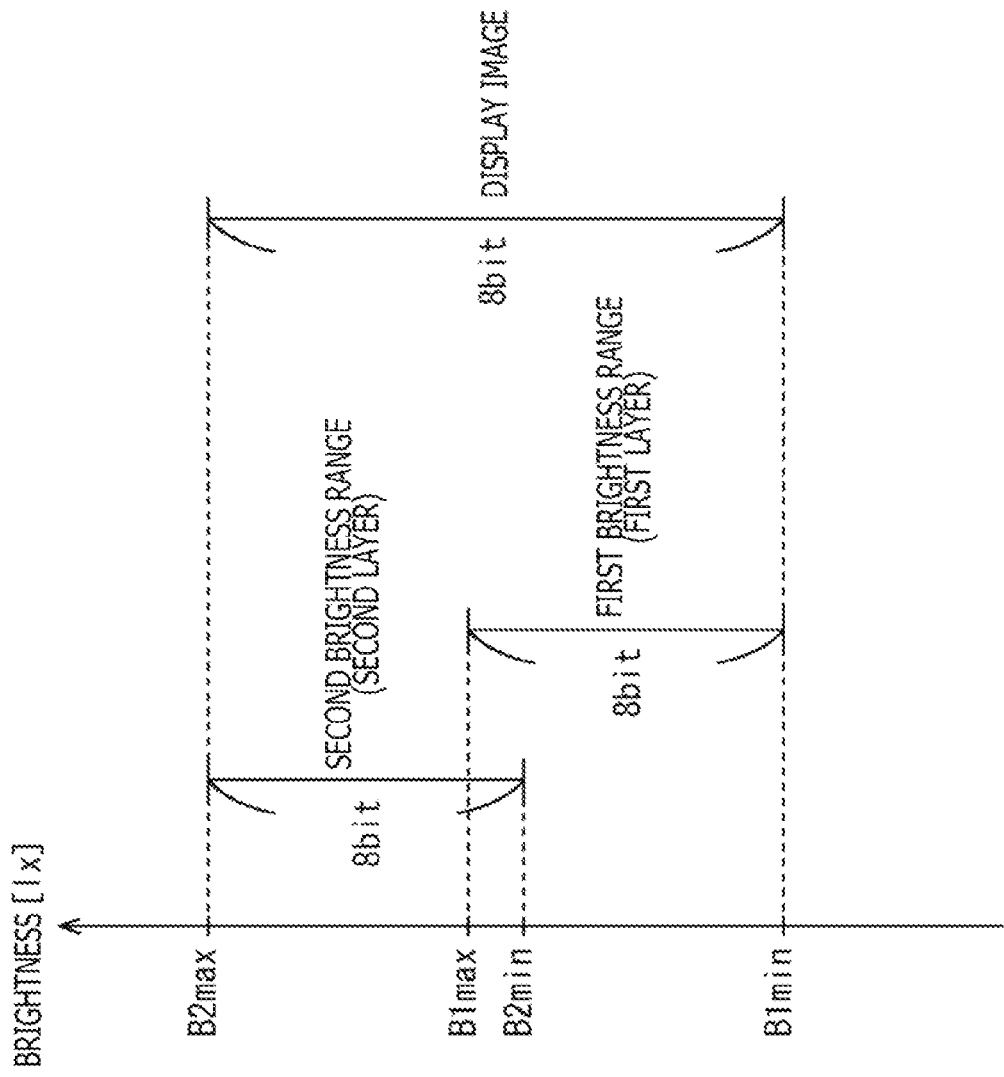
FIG. 10 depicts a relationship between a first brightness range, a second brightness range, and a display image.

FIG. 10 depicts a relationship between, the first brightness range, the second brightness range, and the display image.

In a case where each camera of the multi-camera 11 takes a photographed image corresponding to the texture image of the first layer, each camera sets the first brightness range to a range in which the brightness of the subject is from B1min [lx] to B1max [lx] (B1min [lx]<B1max [lx]) and takes the image in 8 bits as illustrated in FIG. 10.

In a case where each camera of the multi-camera 11 takes a photographed image corresponding to the texture image of the second layer, each camera sets the second brightness range to a range in which the brightness of the subject is from B2min [lx] to B2max [lx] (B1min [lx]<B2min [lx] <B2max [lx], B1max [lx]<B2max [lx]) and takes the image in 8 bits as illustrated in FIG. 10. Incidentally, although B2min [lx] is greater than B1max [lx] in the example of FIG. 10, B2min [lx] and B1max [lx] may be the same.

The metadata generating section 57 generates brightness range information indicating the first brightness range and the second brightness range, specifically, the values of B1min [lx], B1max [lx], B2min [lx], and B2max [lx], as part of metadata. The values of B1min [lx], B1max [lx], B2min [lx], and B2max [lx] may be obtained from the multi-camera 11, or values input by the user in the content server 12 may be obtained.

The texture image of the first layer and the texture image of the second layer are generated from the photographed images taken in this way, and the first layer texture stream and the second layer texture stream are transmitted to the home server 13.

In a case where the home server 13 uses the texture images of the first layer and the second layer to generate a display image, the home server 13 generates a display image expressing the range from B1min [lx] to B2max [lx] in 8 bits. For an overlapping range from B2min [lx] to B1max [lx], an average value of the two layers is adopted, for example.

In a case where the display image is generated by using only the texture image of the first layer photographed in the first brightness range, the brightness equal to or greater than B1max [lx] cannot be expressed, and the image exhibits so-called blown-out highlights. By including the texture image of the second layer photographed in the second brightness range, the brightness equal to or greater than B1max [lx] can be expressed in the display image.

Incidentally, although the number of bits of the luminance values of the texture images of the first and second layers and the display image is 8 bits in the case described in the example of FIG. 10, the number of bits may be another number of bits, such as 10 bits and 16 bits. In addition, the number of bits of the luminance values of the texture images of the first and second layers and the number of bits of the luminance values of the display image may be different.

(Description of Process of Content Server)

Figure 11:
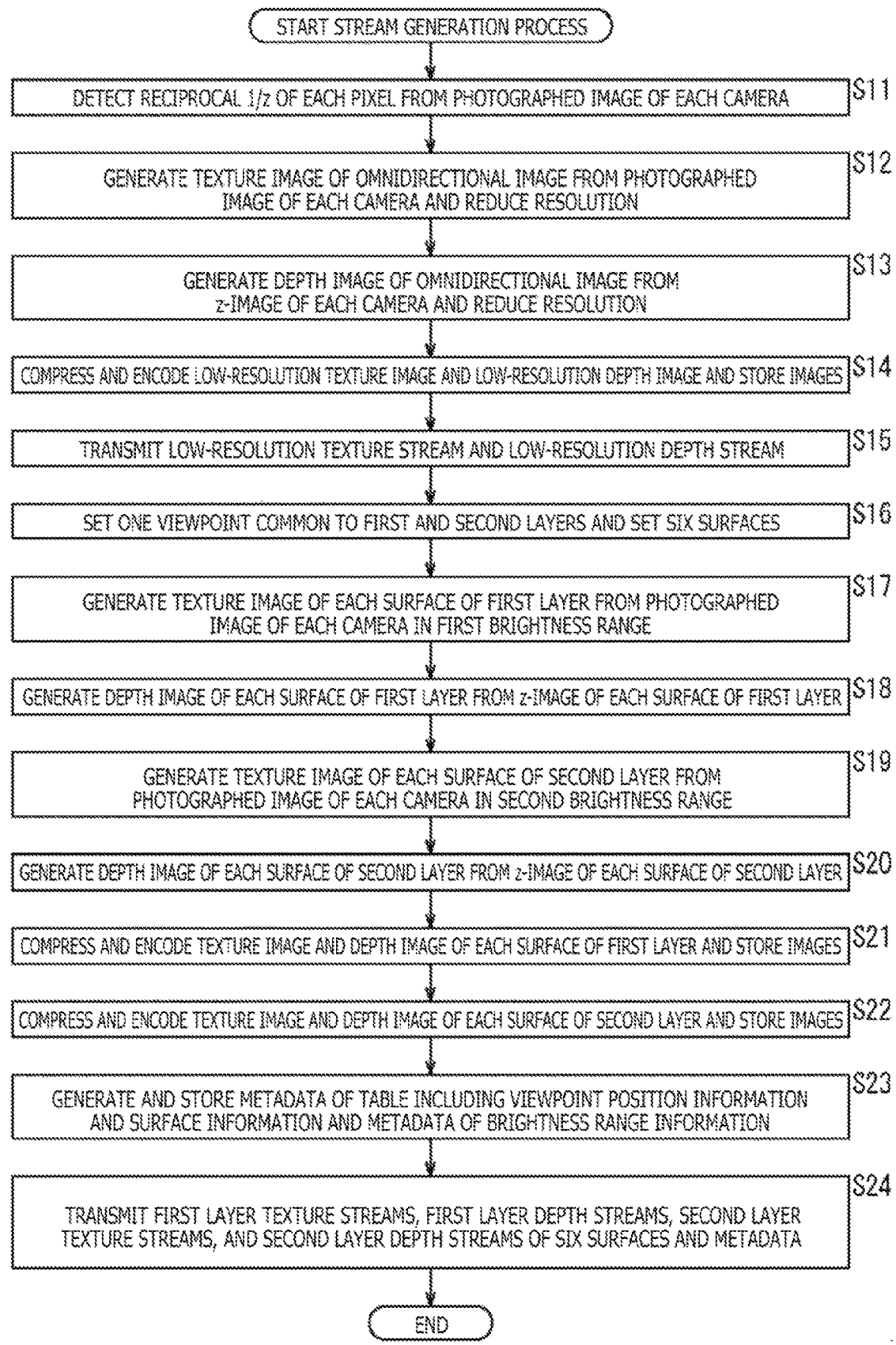
FIG. 11 is a flow chart explaining a stream generation process.

FIG. 11 is a flow chart explaining a stream generation process of the content server 12 of FIG. 2. The stream generation process is started when the photographed images are supplied frame-by-frame from the cameras of the multi-camera 11 of FIG. 1.

In step S11 of FIG. 10, the depth detecting section 31 of the content server 12 detects the reciprocal 1/z of each pixel of the photographed image of each camera in the first brightness range from the photographed image of each camera in the first brightness range supplied from the multi-camera 11 and supplies the reciprocal 1/z to the low-resolution image processing section 33 and the high-resolution image processing section 34.

In step S12, the low-resolution image processing section 33 uses the predetermined three-dimensional position in the camera coordinate system as the viewpoint to generate the texture image of the omnidirectional image from the photographed image of each camera in the first brightness range supplied from the multi-camera 11 and reduces the resolution.

In step S13, the low-resolution image processing section 33 generates the depth image of the omnidirectional image from the z-image of each camera in the first brightness range supplied from the depth detecting section 31 and reduces the resolution.

In step S14, the low-resolution image processing section 33 compresses and encodes the low-resolution texture image generated in the process of step S12 and the low-resolution depth image generated in the process of step S13 and stores the images.

In step S15, the low-resolution image processing section 33 transmits the stored low-resolution texture stream and low-resolution depth stream to the home server 13 of FIG. 1.

In step S16, the setting section 56 (FIG. 3) of the high-resolution image processing section 34 sets the origin in the 3D model coordinate system as one viewpoint common to the first and second layers and sets the six surfaces of the cube around the viewpoint as the surfaces of the first layer. The setting section 56 also sets the same six surfaces as the surfaces of the first layer as the surfaces of the second layer. The setting section 56 supplies the viewpoint position information indicating one viewpoint common to the first and second layers and the surface information of the six surfaces to the first layer generating section 50, the second layer generating section 53, and the metadata generating section 57.

In step S17, the first layer generating section 50 sets the viewpoint of the omnidirectional image in the camera coordinate system as the origin and sets the origin indicated in the viewpoint position information of the first layer as the viewpoint to generate the texture image of each surface corresponding to each piece of surface information of the first layer from the photographed image of each camera in the first brightness range.

In step S18, the first layer generating section 50 generates the z-image of each surface corresponding to each piece of surface information of the first layer from the z-image of each camera in the first brightness range and supplies the z-image to the quantization section 51. The quantization section 51 generates the depth image of each surface of the first layer from the z-image of each surface of the first layer and supplies the depth image to the encoder 52.

In step S19, for each surface corresponding to the surface information of the second layer, the second layer generating section 53 sets the viewpoint of the omnidirectional image in the camera coordinate system as the origin and sets the three-dimensional position indicated in the viewpoint position information of the second layer as the viewpoint to generate the texture image of each surface of the second layer from the photographed image of each camera in the second brightness range.

In step S20, for each surface corresponding to the surface information of the second layer, the second layer generating section 53 generates the z-image of each surface corresponding to each piece of surface information of the second layer from the z-image of each camera in the second brightness range and supplies the z-image to the quantization section 54. The quantization section 54 generates the depth image of each surface of the second layer from the z-image of each surface of the second layer.

In step S21, the encoder 52 compresses and encodes the texture image and the depth image of each surface of the first layer according to the surface and the type of image and supplies the images to the storage 58 to store the images.

In step S22, the encoder 55 compresses and encodes the texture image and the depth image of each surface of the second layer according to the surface and the type of image and supplies the images to the storage 58 to store the images.

In step S23, the metadata generating section 57 generates the metadata of the table including the viewpoint position information common to the first and second layers and the surface information supplied from the setting section 56 and the metadata of the brightness range information indicating the first brightness range and the second brightness range and supplies the metadata to the storage 58 to store the metadata.

In step S24, the transmitting section 60 reads the first layer texture streams, the first layer depth streams, the second layer texture streams, and the second layer depth streams of the six surfaces and the metadata from the storage 58 and transmits them to the home server 13.

In this way, the content server 12 generates the texture images and the depth images of the first and second layers with different brightness ranges and transmits the images to the home server 13. As a result, the home server 13 can generate a display image of high picture quality.

The content server 12 also sets the y-value of each pixel of the depth image to the value obtained by the 8-bit quantization of the reciprocal $1/r$. Therefore, the content server 12 does not have to perform the 8-bit quantization of the depth image again in the reconstruction.

Incidentally, although the first layer texture streams, the first layer depth streams, the second layer texture streams, and the second layer depth streams not reconstructed are transmitted to the home server 13 in the stream generation process, the streams after the reconstruction can also be transmitted.

(Configuration Example of Home Server)

Figure 12:
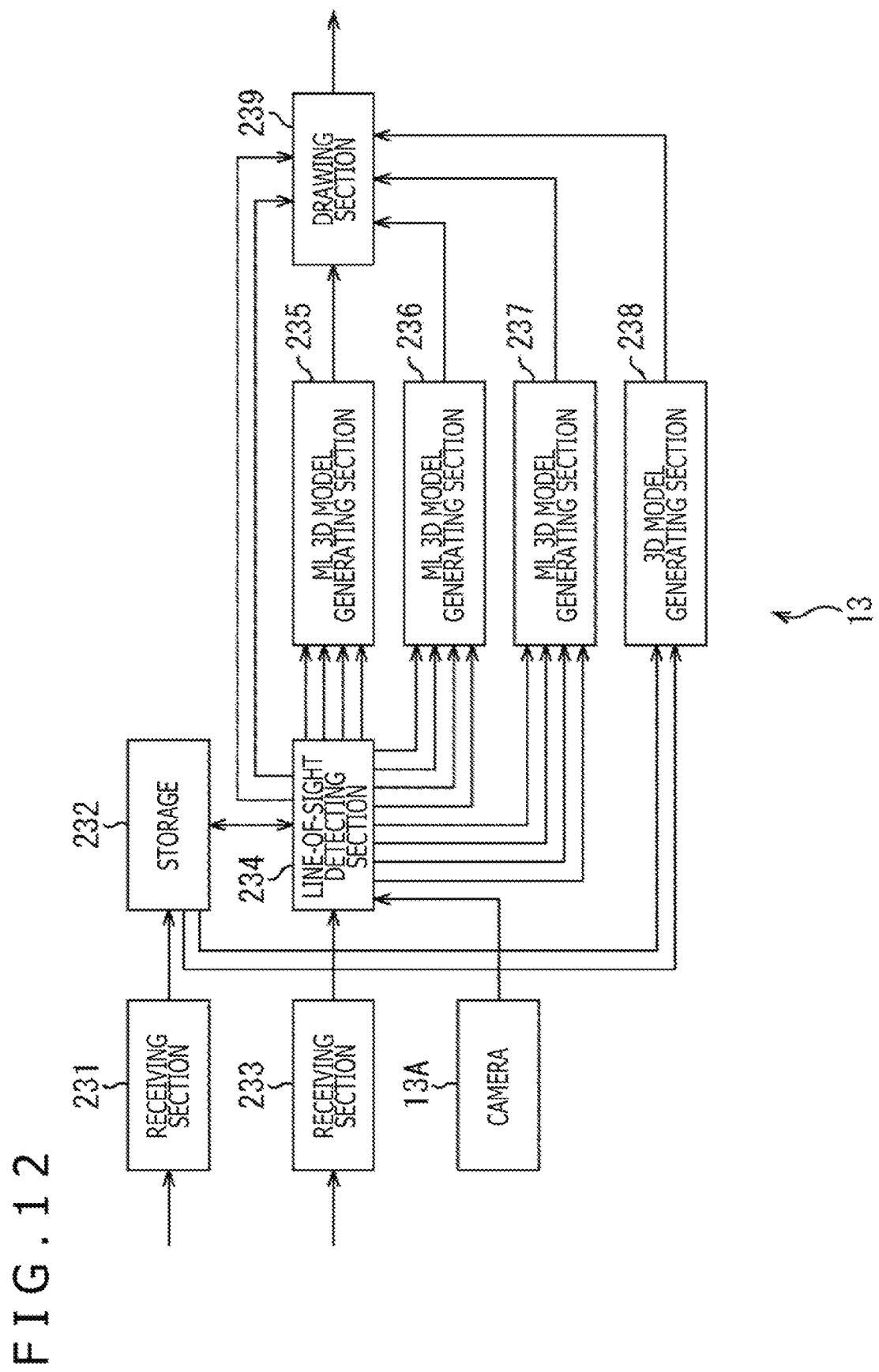
FIG. 12 is a block diagram depicting a configuration example of a home server.

FIG. 12 is a block diagram depicting a configuration example of the home server 13 of FIG. 1.

The home server 13 of FIG. 12 includes the camera 13A, a receiving section 231, a storage 232, a receiving section 233, a line-of-sight detecting section 234, an ML 3D model generating section 235, an ML 3D model generating section 236, an ML 3D model generating section 237, a 3D model generating section 238, and a drawing section 239.

The receiving section 231 of the home server 13 receives the low-resolution texture stream and the low-resolution depth stream, the first layer texture streams, the first layer depth streams, the second layer texture streams, and the second layer depth streams of the six surfaces, and the metadata transmitted from the content server 12 and supplies them to the storage 232.

The storage 232 stores the low-resolution texture stream and the low-resolution depth stream, the first layer texture streams, the first layer depth streams, the second layer texture streams, and the second layer depth streams of the six surfaces, and the metadata supplied from the receiving section 231.

The receiving section 233 receives the detection result of the gyro sensor 15B of FIG. 1 from the head-mounted display 15 and supplies the detection result to the line-of-sight detecting section 234.

The line-of-sight detecting section 234 determines the line-of-sight direction of the viewer in the 3D model coordinate system on the basis of the detection result of the gyro sensor 15B supplied from the receiving section 233. The line-of-sight detecting section 234 also obtains the photographed image of the marker 15A from the camera 13A and detects the viewing position in the 3D model coordinate system on the basis of the photographed image.

The line-of-sight detecting section 234 reads the table of the first layer in the metadata from the storage 232. The line-of-sight detecting section 234 determines selected surfaces including three surfaces corresponding to the line-of-sight vector closest to the line of sight extending in the line-of-sight direction from the viewing position among the six surfaces based on the viewing position and the line-of-sight direction in the 3D model coordinate system and the table of the first layer. Specifically, the line-of-sight detecting section 234 determines the selected surfaces including one of the +X surface 81 and the −X surface 82, one of the +Y surface 83 and the −Y surface 84, and one of the +Z surface 85 and the −Z surface 86.

The selected surfaces are determined in this way, and the proportion of a high-resolution area is maximized in the display image generated by the drawing section 239 described later using the texture images and the depth images of the first and second layers corresponding to the selected surfaces. In addition, the determination of the three selected surfaces can increase the proportion of the high-resolution area in the display image in a case where the line of sight is toward the proximity of the vertex of the cube 80, compared to a case where one selected surface is selected.

The line-of-sight detecting section 234 reads the first layer texture streams, the first layer depth streams, the second layer texture streams, and the second layer depth streams corresponding to the three selected surfaces from the storage 232. The line-of-sight detecting section 234 supplies the read first layer texture streams, first layer depth streams, second layer texture streams, and second layer depth streams to the ML 3D model generating sections 235 to 237 according to the surface. The line-of-sight detecting section 234 also reads the low-resolution texture stream and the low-resolution depth stream from the storage 232 and supplies the streams to the 3D model generating section 238.

The line-of-sight detecting section 234 also determines the field-of-view range of the viewer in the 3D model coordinate system on the basis of the viewing position and the line-of-sight direction in the 3D model coordinate system. The line-of-sight detecting section 234 supplies the field-of-view range and the viewing position of the viewer to the drawing section 239. The line-of-sight detecting section 234 further supplies the viewpoint position information and the surface information indicating the three selected surfaces to the drawing section 239.

Each of the ML 3D model generating sections 235 to 237 uses the first layer texture stream and the first layer depth stream to generate three-dimensional data including three-dimensional positions (u, v, z) and connection information of the sampling points corresponding to the pixels of the texture image of the first layer in the texture image coordinate system and including RGB values as color information. Incidentally, the connection information of each sampling point is information indicating connection between the sampling point (vertex) and other sampling points. The texture image coordinate system is a coordinate system in which the lateral direction of the texture image is the u-axis, the longitudinal direction is the v-axis, and the depth direction is the z-axis.

Each of the ML 3D model generating sections 235 to 237 also uses the second layer texture stream and the second layer depth stream to generate three-dimensional data including three-dimensional positions (u, v, z) and connection information of the sampling points corresponding to the pixels of the texture image of the second layer in the texture image coordinate system and including RGB values as the color information. The ML 3D model generating sections 235 to 237 supply the three-dimensional data of the first and second layers to the drawing section 239.

The 3D model generating section 238 decodes the low-resolution texture stream and the low-resolution depth stream supplied from the line-of-sight detecting section 234 to generate the low-resolution texture image and the low-resolution depth image. The 3D model generating section 238 converts the YCbCr value as a pixel value of each pixel of the low-resolution texture image into an RGB value and sets the value as the RGB value of the sampling point corresponding to the pixel. The 3D model generating section 238 also performs the 8-bit inverse quantization of the pixel value of each pixel of the low-resolution depth image to obtain the reciprocal 1/r. The 3D model generating section 238 then obtains the three-dimensional position (u, v, z) of each pixel as the three-dimensional position (u, v, z) of the sampling point corresponding to each pixel on the basis of the reciprocal 1/r of each pixel of the low-resolution depth image.

The 3D model generating section 238 also generates connection information of the sampling points on the basis of the three-dimensional positions (u, v, z) of the sampling points so that three adjacent sampling points are connected. The 3D model generating section 238 supplies three-dimensional data of the low-resolution texture image including the three-dimensional position (u, v, z), the connection information, and the RGB value of each sampling point to the drawing section 239.

The drawing section 239 draws triangular patches (draws point groups) of the low-resolution texture image in the 3D model coordinate system on the basis of the three-dimensional data of the low-resolution texture image supplied from the 3D model generating section 238. Subsequently, the drawing section 239 draws triangular patches of the high-resolution texture image integrating the first and second layers in the 3D model coordinate system on the basis of the three-dimensional data of the first and second layers supplied from each of the ML 3D model generating sections 235 to 237 and based on the viewpoint position information and the surface information supplied from the line-of-sight detecting section 234. The high-resolution texture image integrating the first and second layers is a texture image including the luminance information of the entire range (from minimum value B1min to maximum value B2max) including the first brightness range expressed by the texture image of the first layer and the second brightness range expressed by the texture image of the second layer as described with reference to FIG. 10.

The viewpoint of the low-resolution texture image is the origin in the 3D model coordinate system, and the position and the size of each surface of the regular octahedron in the 3D model are predetermined. Therefore, the drawing section 239 can obtain internal parameters and external parameters of each camera corresponding to each surface of the regular octahedron. Thus, the drawing section 239 can use the internal parameters and the external parameters to recognize the position (u, v) of each sampling point on the screen and the three-dimensional position (x, y, z) in the 3D model coordinate system based on the three-dimensional position (u, v, z) of each sampling point of the low-resolution texture image. As a result, the drawing section 239 can use the position (u, v) on the screen, the three-dimensional position (X, Y, Z), the connection information, and the RGB value of each sampling point of the low-resolution texture image to draw the triangular patches.

The drawing section 239 can also obtain internal parameters and external parameters of each camera corresponding to each surface of the first and second layers on the basis of the viewpoint position information and the surface information of the first and second layers. Therefore, the drawing section 239 can use the internal parameters and the external parameters to recognize the position (u, v) of each sampling point on the screen and the three-dimensional position (X, Y, Z) based on the three-dimensional position (u, v, z) of each sampling point of the first and second layers. As a result, the drawing section 239 can use the position (u, v) on the screen, the three-dimensional position (X, Y, Z), the connection information, and the RGB value of each sampling point of the first and second layers to draw the triangular patches.

The drawing section 239 (image generating section) uses the viewing position supplied from the line-of-sight detecting section 234 as the viewpoint to perform, in the field-of-view range, the perspective projection (mapping) of the triangular patch drawn in the 3D model coordinate system. In this way, the drawing section 239 generates the display image from the viewpoint of the viewer. The drawing section 239 transmits the display image to the conversion apparatus 14 of FIG. 1.

(Configuration Example of ML 3D Model Generating Section)

Figure 13:
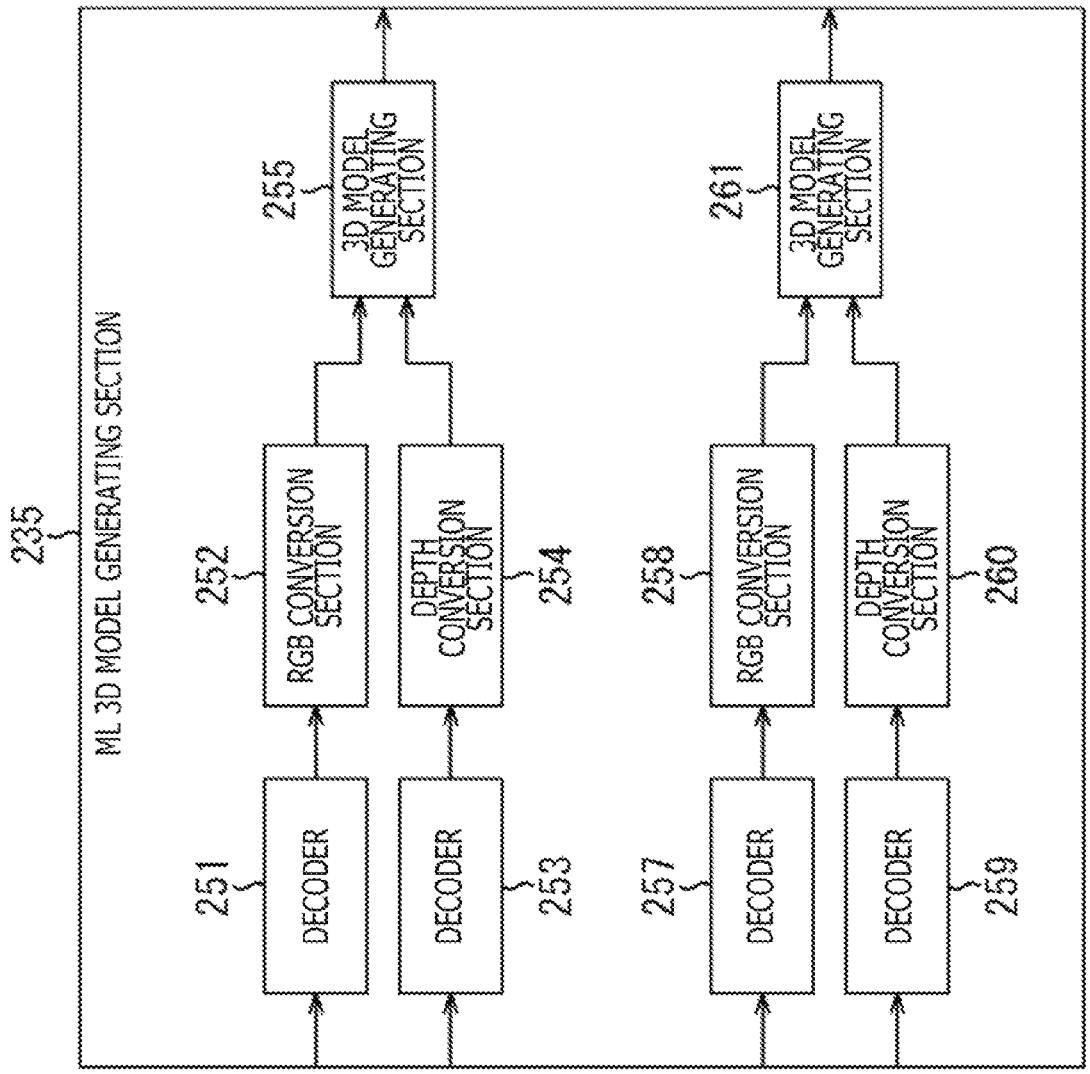
FIG. 13 is a block diagram depicting a configuration example of an ML 3D model generating section.

FIG. 13 is a block diagram depicting a configuration example of the ML 3D model generating section 235 of FIG. 12.

The ML 3D model generating section 235 of FIG. 13 includes a decoder 251, an RGB conversion section 252, a decoder 253, a depth conversion section 254, a 3D model generating section 255, a decoder 257, an RGB conversion section 258, a decoder 259, a depth conversion section 260, and a 3D model generating section 261.

The decoder 251 of the ML 3D model generating section 235 decodes the first layer texture stream supplied from the line-of-sight detecting section 234 of FIG. 12 and generates the texture image of the first layer. The decoder 251 supplies the texture image of the first layer to the RGB conversion section 252.

The RGB conversion section 252 converts the YCbCr value as a pixel value of each pixel of the texture image of the first layer into an RGB value and sets the value as the RGB value of the sampling point corresponding to each pixel. The RGB conversion section 252 then supplies the RGB value of each sampling point to the 3D model generating section 255.

The decoder 253 decodes the first layer depth stream supplied from the line-of-sight detecting section 234 and generates the depth image of the first layer. The decoder 253 supplies the depth image of the first layer to the depth conversion section 254.

The depth conversion section 254 performs the 8-bit inverse quantization of the pixel value of each pixel of the depth image of the first layer supplied from the decoder 253 and obtains the reciprocal 1/r. The depth conversion section 254 then obtains the three-dimensional position (u, v, z) of each pixel as a three-dimensional position (u, v, z) of the sampling point corresponding to each pixel on the basis of the reciprocal 1/r of each pixel of the depth image of the first layer. The depth conversion section 254 supplies the three-dimensional position (u, v, z) of each sampling point to the 3D model generating section 255.

The 3D model generating section 255 (connection information generating section) generates the connection information of the sampling points on the basis of the three-dimensional positions (u, v, z) of the sampling points supplied from the depth conversion section 254 so that three adjacent sampling points of the sampling points are connected to each other. That is, for each sampling point, the 3D model generating section 255 generates the connection information indicating the connection of three vertices of the triangular patches including the sampling point as a vertex.

The 3D model generating section 255 generates the three-dimensional data of the first layer including the three-dimensional position (u, v, z), the RGB value, and the connection information of each sampling point of the first layer and supplies the three-dimensional data to the drawing section 239 of FIG. 12.

The processes of the decoder 257, the RGB conversion section 258, the decoder 259, the depth conversion section 260, and the 3D model generating section 261 are similar to the processes of the decoder 251, the RGB conversion section 252, the decoder 253, the depth conversion section 254, and the 3D model generating section 255 except that the layer to be processed is changed from the first layer to the second layer. Therefore, the description will not be repeated.

Incidentally, although not illustrated, the configuration of the ML 3D model generating section 236 and the ML 3D model generating section 237 is similar to the configuration of the ML 3D model generating section 235 of FIG. 13.
(Description of Advantageous Effects of Angle of View of Surface in First Layer)

FIGS. 14A, 14B, 15A, and 15B are diagrams explaining the sampling points of cases in which the angles of view of each surface of the first layer are 90 degrees and 100 degrees, respectively.

In the examples of FIGS. 14A, 14B, 15A, and 15B, it is assumed that the resolutions of the texture image and the depth image of the first layer in the cases where the angles of view of each surface of the first layer are 90 degrees and 100 degrees are 4×4 pixels and 6×6 pixels, respectively, for the convenience of description.

Figure 14B:
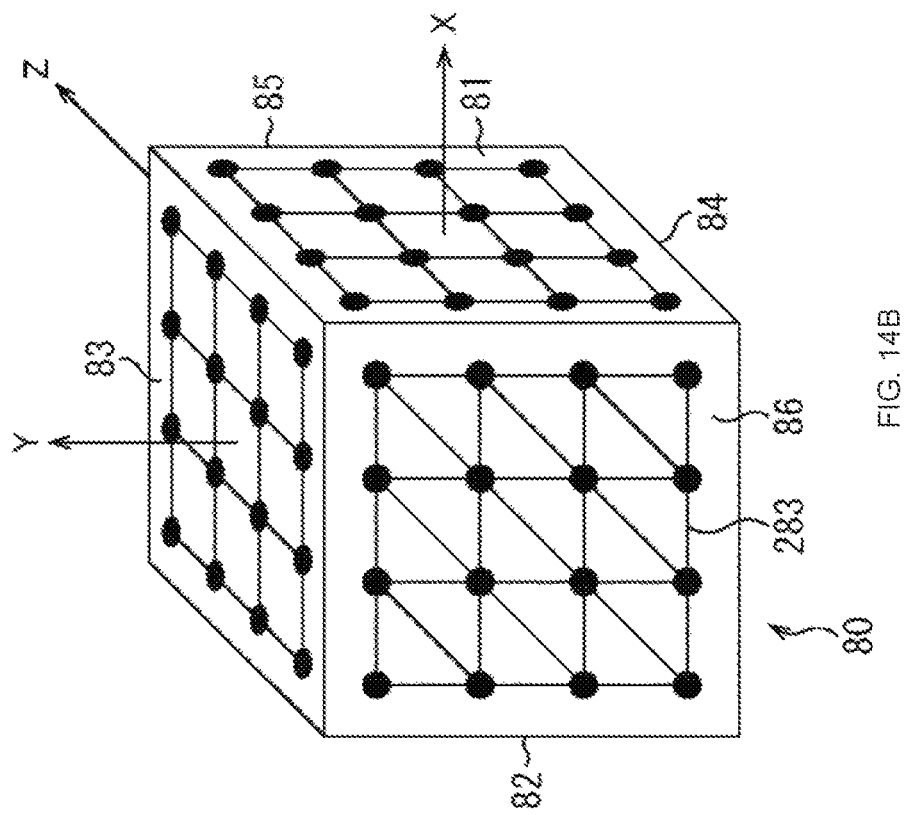
FIGS. 14A and 14B are diagrams explaining an example of sampling points.

As illustrated in FIG. 14B, the six surfaces of the first layer are the six surfaces 81 to 86 of the cube 80 in the case where the angle of view of each surface of the first layer is 90 degrees.

Figure 14A:
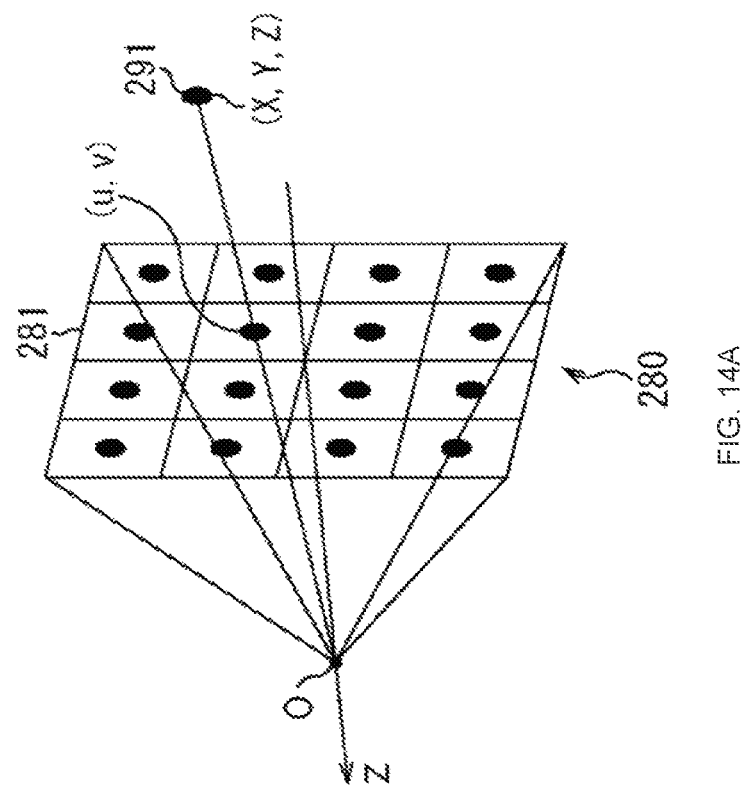

However, as illustrated in FIG. 14A, the position (u, v) of a sampling point 291 on a texture image 280 of the −Z surface 86 of the first layer, that is, the position where the line from the viewpoint O in the 3D model coordinate system toward the sampling point 291 intersects with the −Z surface 86, is the center of each pixel 281. The position (u, v) of the sampling point of the other surfaces 81 to 85 is also the center of each pixel as in the −Z surface 86.

Therefore, as illustrated in FIG. 14B, the size of all of the triangular patches, which are formed by connecting three adjacent sampling points among the sampling points indicated by black dots in FIGS. 14A and 14B, in the u-direction and the v-direction in an area 283 on each of the surfaces 81 to 86 is smaller than each of the surfaces 81 to 86 by half the pixel. Therefore, the triangular patches corresponding to the boundaries of the surfaces 81 to 86 are not generated, and as a result, it is difficult to generate a high-quality display image of the line-of-sight passing through the boundaries of the surfaces 81 to 86.

Figure 15B:
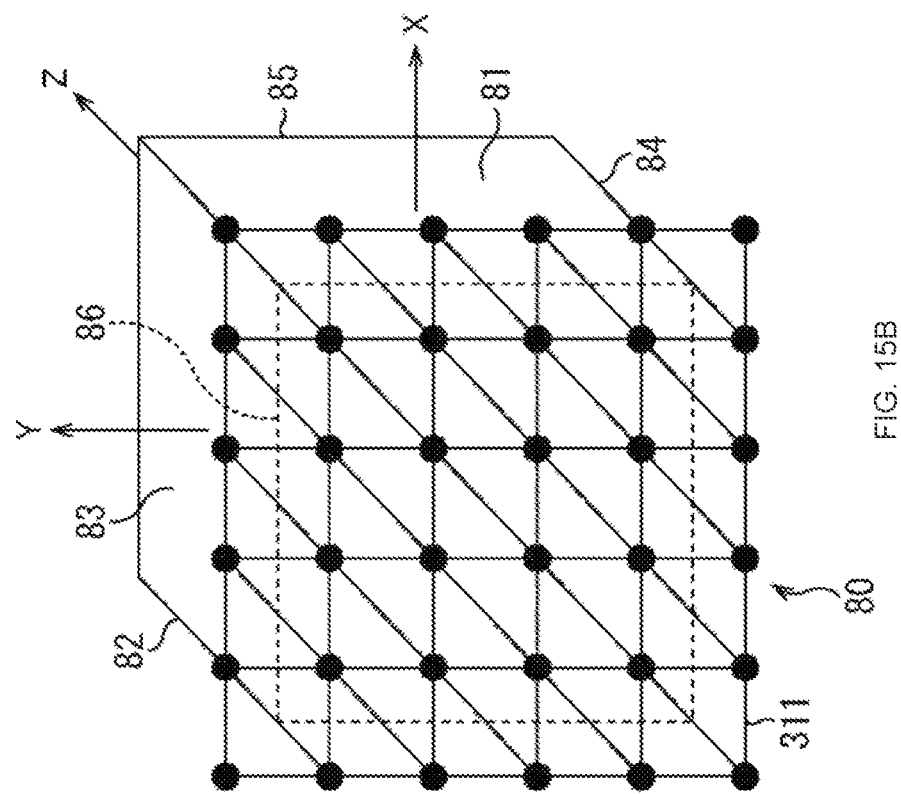
FIGS. 15A and 15B are diagrams explaining another example of the sampling points.
Figure 15A:
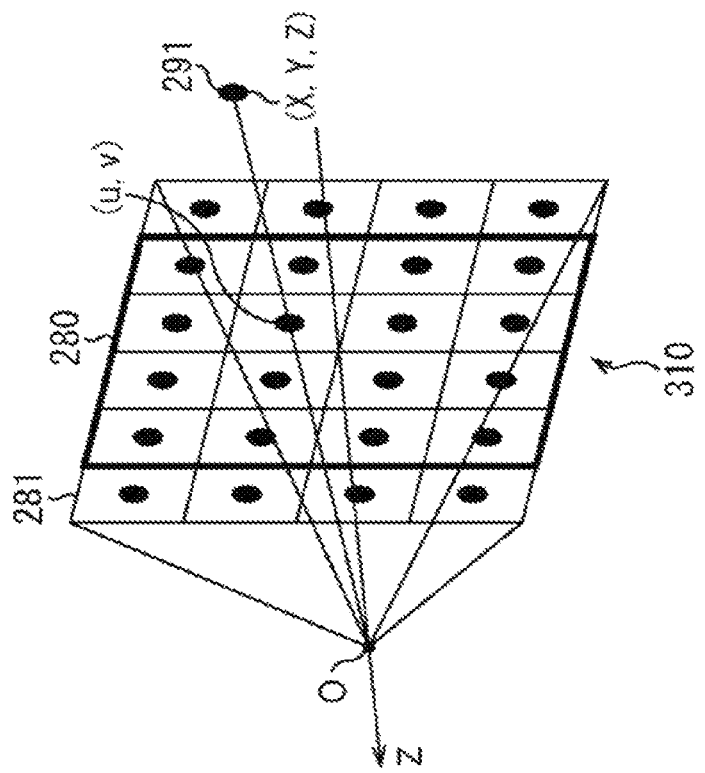

On the other hand, in the case where the angle of view of each surface of the first layer is 100 degrees, the size of a texture image 310 of the surface of the first layer including the −Z surface 86 is 6×6 pixels as illustrated in FIG. 15A that is greater than the size of the texture image 280 of FIGS. 14A and 14B. The size of the texture image of each surface of the first layer including the other surfaces 81 to 85 is similarly 6×6 pixels.

Therefore, as illustrated in FIG. 15B, the size of all of the triangular patches, which are formed by connecting three adjacent sampling points among the sampling points indicated by black dots in FIGS. 15A and 15B, in the u-direction and the v-direction in an area 311 on the −Z surface 86 is greater than the −Z surface 86 by half the pixel. Although not illustrated, the size of the area of the triangular patches in the u-direction and the v-direction in each surface of the first layer including each of the other surfaces 81 to 85 is greater than each of the surfaces 81 to 85 by half the pixel as in the area 311. Therefore, the triangular patches corresponding to the boundaries of the surfaces 81 to 86 are generated, and as a result, a high-quality display image of an arbitrary line of sight including the line of sight passing through the boundaries of the surfaces 81 to 86 can be generated.

Although the advantageous effects of the case in which the angle of view of each surface of the first layer is 100 degrees are described in FIGS. 14A 14B, 15A, and 15B, similar advantageous effects are obtained even in a case where the angle of view is not 100 degrees as long as the angle of view of each surface of the first layer is greater than 90 degrees. Similar advantageous effects are obtained for the second layer.

Incidentally, the ML 3D model generating sections 235 to 237 may apply an imaging process, such as a filtering process using surrounding pixels, to the texture image and the depth image obtained as a result of the decoding. In this case, setting the angle of view of each surface of the first and second layers greater than 90 degrees can obtain an advantageous effect that the imaging process can be executed at an edge of the area other than the edge of each surface.

(Description of Process of Home Server)

Figure 16:
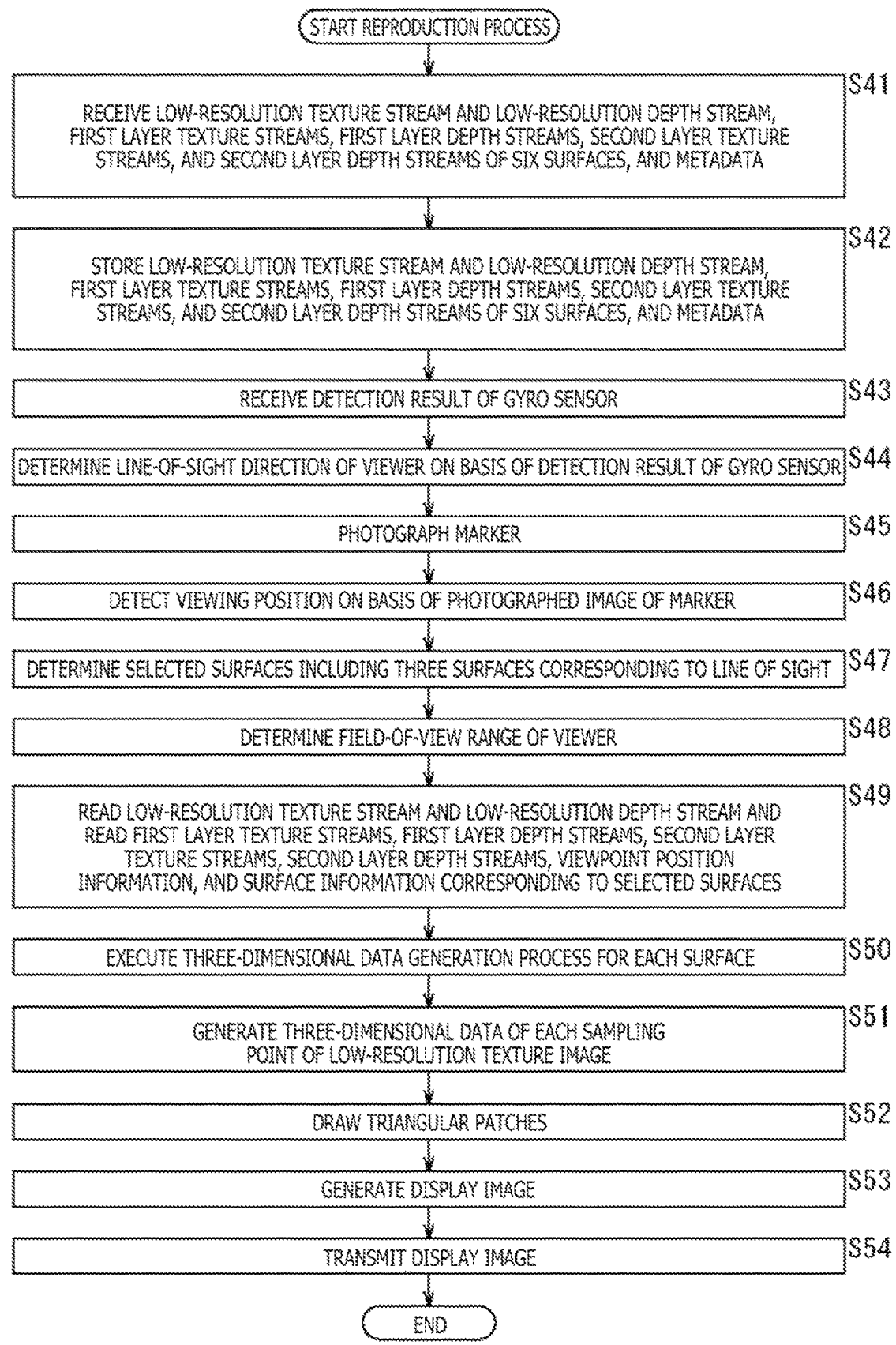
FIG. 16 is a flow chart explaining a reproduction process.

FIG. 16 is a flow chart explaining a reproduction process of the home server 13 of FIG. 12. The reproduction process is started when, for example, the low-resolution texture stream and the low-resolution depth stream, the first layer texture streams, the first layer depth streams, the second layer texture streams, and the second layer depth streams of the six surfaces, and the metadata are transmitted from the content server 12.

In step S41 of FIG. 16, the receiving section 231 of the home server 13 receives the low-resolution texture stream and the low-resolution texture stream, the first layer texture streams, the first layer depth streams, the second layer texture streams, and the second layer depth streams of the six surfaces, and the metadata from the content server 12 and supplies them to the storage 232.

In step S42, the storage 232 stores the low-resolution texture stream and the low-resolution depth stream, the first layer texture streams, the first layer depth streams, the second layer texture streams, and the second layer depth streams of the six surfaces, and the metadata.

In step S43, the receiving section 233 receives the detection result of the gyro sensor 15B of FIG. 1 from the head-mounted display 15 and supplies the detection result to the line-of-sight detecting section 234.

In step S44, the line-of-sight detecting section 234 determines the line-of-sight direction of the viewer in the 3D model coordinate system on the basis of the detection result of the gyro sensor 15B supplied from the receiving section 233. In step S45, the camera 13A photographs the marker 15A attached to the head-mounted display 15 and supplies the photographed image obtained as a result of the photographing to the line-of-sight detecting section 234.

In step S46, the line-of-sight detecting section 234 detects the viewing position in the 3D model coordinate system based on the photographed image of the marker 15A supplied from the camera 13A and supplies the viewing position to the drawing section 239.

In step S47, the line-of-sight detecting section 234 determines the selected surfaces including three surfaces corresponding to the line-of-sight vector closest to the line of sight among the six surfaces on the basis of the table of the first layer in the metadata stored in the storage 232 and based on the viewing position and the line-of-sight direction in the 3D model coordinate system.

In step S48, the line-of-sight detecting section 234 determines the field-of-view range of the viewer in the 3D model coordinate system on the basis of the viewing position and the line-of-sight direction in the 3D model coordinate system and supplies the field-of-view range to the drawing section 239.

In step S49, the line-of-sight detecting section 234 reads the low-resolution texture stream and the low-resolution depth stream from the storage 232 and supplies the streams to the 3D model generating section 238. The line-of-sight detecting section 234 also reads the first layer texture streams, the first layer depth streams, the second layer texture streams, and the second layer depth streams corresponding to the three selected surfaces from the storage 232. The line-of-sight detecting section 234 supplies the read first layer texture streams, first layer depth streams, second layer texture streams, and second layer depth streams to the ML 3D model generating sections 235 to 237 according to the surface. The line-of-sight detecting section 234 also reads the viewpoint position information and the surface information corresponding to the three selected surfaces from the storage 232 and supplies the information to the drawing section 239.

In step S50, the ML 3D model generating sections 235 to 237 execute, for each surface, a three-dimensional data generation process of generating three-dimensional data of each sampling point of the first and second layers. Details of the three-dimensional data generation process will be described later with reference to FIG. 17.

In step S51, the 3D model generating section 238 generates the three-dimensional data of each sampling point of the low-resolution texture image from the low-resolution texture stream and the low-resolution depth stream supplied from the line-of-sight detecting section 234 and supplies the three-dimensional data to the drawing section 239.

In step S52, the drawing section 239 draws the triangular patches of the low-resolution texture image in the 3D model coordinate system on the basis of the three-dimensional data of the low-resolution texture image supplied from the 3D model generating section 238. Subsequently, the drawing section 239 draws the triangular patches of the high-resolution texture image integrating the first and second layers in the 3D model coordinate system based on the three-dimensional data of the first and second layers supplied from each of the ML 3D model generating sections 235 to 237 and on the basis of the viewpoint position information and the surface information supplied from the line-of-sight detecting section 234.

In step S53, the drawing section 239 uses the viewing position supplied from the line-of-sight detecting section 234 as the viewpoint and performs, in the field-of-view range, the perspective projection of the triangular patches drawn in the 3D model coordinate system to generate the display image from the viewpoint of the viewer. In step S54, the drawing section 239 transmits the display image to the conversion apparatus 14 of FIG. 1.

Figure 17:
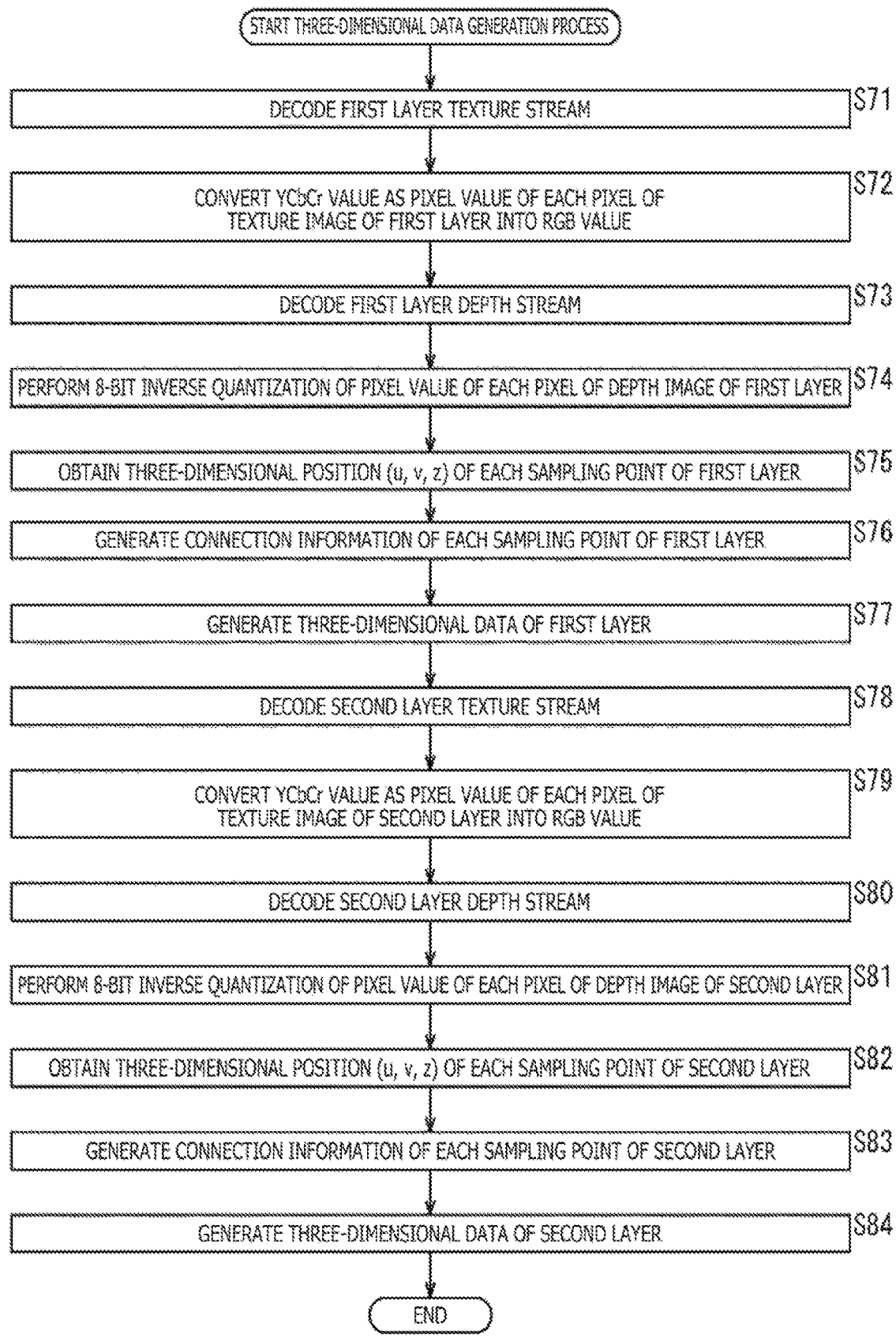
FIG. 17 is a flow chart explaining details of a three-dimensional data generation process.

FIG. 17 is a flow chart explaining the details of the three-dimensional data generation process executed by the ML 3D model generating section 235 in step S50 of FIG. 16.

In step S71 of FIG. 17, the decoder 251 (FIG. 13) of the ML 3D model generating section 235 decodes the first layer texture stream supplied from the line-of-sight detecting section 234 of FIG. 12 and generates the texture image of the first layer. The decoder 251 supplies the texture image of the first layer to the RGB conversion section 252.

In step S72, the RGB conversion section 252 converts the YCbCr value as a pixel value of each pixel of the texture image of the first layer into the RGB value and sets the value as the RGB value of the sampling point corresponding to each pixel. The RGB conversion section 252 then supplies the RGB value of each sampling point to the 3D model generating section 255.

In step S73, the decoder 253 decodes the first layer depth stream supplied from the line-of-sight detecting section 234 and generates the depth image of the first layer. The decoder 253 supplies the depth image of the first layer to the depth conversion section 254.

In step S74, the depth conversion section 254 performs the 8-bit inverse quantization of the pixel value of each pixel of the depth image of the first layer supplied form the decoder 253 and obtains the reciprocal $1/r$ of each pixel of the depth image of the first layer.

In step S75, the depth conversion section 254 obtains the three-dimensional position $(u, v, z)$ of each pixel of the depth image of the first layer as the three-dimensional position (u, v, z) of the sampling point corresponding to each pixel on the basis of the reciprocal 1/r of each pixel of the depth image of the first layer. The depth conversion section 254 supplies the three-dimensional position (u, v, z) of each sampling point to the 3D model generating section 255.

In step S76, the 3D model generating section 255 generates the connection information of each sampling point of the first layer on the basis of the three-dimensional position (u, v, z) of each sampling point supplied from the depth conversion section 254 so that three adjacent sampling points among the sampling points are connected to each other.

In step S77, the 3D model generating section 255 generates the three-dimensional data of the first layer including the three-dimensional position (u, v, z) and the RGB value of each sampling point of the first layer and including the connection information in the process of step S76. The 3D model generating section 255 supplies the three-dimensional data of the first layer to the drawing section 239 of FIG. 12.

In step S78, the decoder 257 decodes the second layer texture stream supplied form the line-of-sight detecting section 234 and generates the texture image of the second layer. The decoder 257 supplies the texture image of the second layer to the RGB conversion section 258.

In step S79, the RGB conversion section 258 converts the YCbCr value as a pixel value of each pixel of the texture image of the second layer into the RGB value and sets the value as the RGB value of the sampling point corresponding to each pixel. The RGB conversion section 258 then supplies the RGB value of each sampling point to the 3D model generating section 261.

In step S80, the decoder 259 decodes the second layer depth stream supplied from the line-of-sight detecting section 234 and generates the depth image of the second layer. The decoder 259 supplies the depth image of the second layer to the depth conversion section 260.

In step S81, the depth conversion section 260 performs the 8-bit inverse quantization of the pixel value of each pixel of the depth image of the second layer supplied from the decoder 259 and obtains the reciprocal 1/r of each pixel of the depth image of the second layer.

In step S82, the depth conversion section 260 obtains the three-dimensional position (u, v, z) of each pixel of the depth image of the second layer as the three-dimensional position (u, v, z) of the sampling point corresponding to each pixel on the basis of the reciprocal 1/r of each pixel of the depth image of the second layer. The depth conversion section 260 supplies the three-dimensional position (u, v, z) of each sampling point to the 3D model generating section 261.

In step S83, the 3D model generating section 261 generates the connection information of each sampling point of the second layer on the basis of the three-dimensional position (u, v, z) of each sampling point supplied from the depth conversion section 260 so that three adjacent sampling points among the sampling points are connected to each other.

In step S84, the 3D model generating section 261 generates the three-dimensional data of the second layer including the three-dimensional position (u, v, z) and the connection information of each sampling point and including the RGB value supplied from the RGB conversion section 258. The 3D model generating section 261 supplies the three-dimensional data of the second layer to the drawing section 239 of FIG. 12.

Incidentally, three-dimensional data generation processes executed by the ML 3D model generating section 236 and the ML 3D model generating section 237 are executed in a manner similar to the three-dimensional data processing of FIG. 17.

In this way, the home server 13 uses the texture image of the first layer and the texture image of the second layer to generate the display image from the viewpoint of the viewer. The first brightness range indicated in the luminance information of the texture image of the first layer and the second brightness range indicated in the luminance information of the texture image of the second layer are different ranges. Therefore, a display image of high picture quality can be generated by using the first and second layers to generate the display image.

The home server 13 uses not only the texture images, but also the depth images to generate the display image. Therefore, the triangular patches can be drawn to map the texture images on the triangular patches in a three-dimensional shape according to the subject, and the triangular patches can be used to generate the display image. Therefore, the display image can be generated with quality higher than in the case of using only the texture images to generate the display image by mapping the texture images on a predetermined surface.

Furthermore, the texture images and the depth images of the first and second layers are texture images and depth images obtained by mapping the texture images and the depth images of the omnidirectional image on a predetermined surface. Therefore, a reproduction apparatus that reproduces only the texture images and the depth images obtained by mapping the texture images and the depth images of the omnidirectional image on the predetermined surface can reproduce the texture image and the depth image of the first layer.

That is, the format of the texture images and the depth images of the first and second layers generated by the content server 12 are compatible with the format of the texture images and the depth images obtained by mapping the texture images and the depth images of the omnidirectional image on the predetermined surface. In addition, the reproduction method of the home server 13 is compatible with the reproduction method of the reproduction apparatus that reproduces only the texture images and the depth images obtained by mapping the texture images and the depth images of the omnidirectional image on the predetermined surface.

Incidentally, the home server 13 may use only the texture image and the depth image of the first layer to generate the display image.

(Example of Changing Depth Distance in Each Layer)

FIG. 18 illustrates a modification of the first embodiment.

In the first embodiment, among the texture image and the depth image of the first layer and the texture image and the depth image of the second layer generated by the first layer generating section 52 and the second layer generating section 54, the texture images of the first and second layers have been generated and transmitted such that the range of the luminance information indicated by the pixel values as image parameters varies between the texture image of the first layer and the texture image of the second layer.

However, the depth images of the first and second layers may be generated and transmitted such that, for example, the range of the luminance information indicated by the pixel values of the texture images of the first and second layers is the same, and the range of the distance information indicated by the pixel values as distance parameters varies between the depth image of the first layer and the depth image of the second layer as illustrated in FIG. 18.

Specifically, each camera of the multi-camera 11 photographs the subjects at the distances from D1min [m] to D2max [m] in the depth direction. The first layer generating section 52 of the content server 12 generates the depth images in a first depth range that is a range from D1min [m] to D1max [m] (D1min [m]<D1max [m]). On the other hand, the second layer generating section 54 generates the depth images in a second depth range that is a range from D2min [m] to D2max [m] (D2min [m]<D2max [m]). Incidentally, although D2min [m] is smaller than D1max [m] in the example of FIG. 18, D2min [m] and D1max [m] may be the same.

The metadata generating section 57 generates depth range information indicating the first depth range and the second depth range, specifically, values of D1min [m], D1max [m], and D2min [m] D2max [m], as part of the metadata. The values of D1min[m], D1max [m], and D2min [m] D2max [m] may be obtained from the multi-camera 11, or values input by the user in the content server 12 may be obtained.

The first layer depth stream and the second layer depth stream are generated from the depth image of the first layer and the depth image of the second layer generated in this way, and the streams are transmitted to the home server 13.

In the case of using the depth images of the first and second layers to generate the display image, the home server 13 generates the display image expressing the distance from D1min [m] to D2max [m] in the depth direction. An average value of two layers is adopted for an overlapping range from B2min [lx] to D1max [m], for example.

The distance equal to or greater than D1max [m] cannot be expressed in the case of using only the depth image of the first layer in the first depth range to generate the display image. By including the depth image of the second layer in the second depth range, the distance equal to or greater than D1max [m] in the depth direction can be expressed in the display image.

Incidentally, the texture images and the depth images of the first and second layers may be generated and transmitted such that both of the range of the luminance information indicated by the pixel values of the texture images of the first and second layers and the range of the distance information indicated by the pixel values of the depth images of the first and second layers vary between the first layer and the second layer.

2. Second Embodiment (Configuration Example of Second Embodiment of Image Display System)

FIG. 19 is a block diagram depicting a configuration example of a second embodiment of the image display system according to the present disclosure.

In the components illustrated in FIG. 19, the same reference signs are provided to the same components as the components in FIG. 1. The overlapping description will be appropriately omitted.

An image display system 400 of FIG. 19 includes the multi-camera 11, the content server 12, the conversion apparatus 14, the head-mounted display 15, a distribution server 401, a network 402, and a reproduction apparatus 403. In the image display system 400, only the first layer texture stream, the first layer depth stream, the second layer texture stream, and the second layer depth stream of one surface corresponding to the line of sight among the six surfaces are distributed to and reproduced by the reproduction apparatus 403.

Specifically, the distribution server 401 of the image display system 400 receives and stores the low-resolution texture stream and the low-resolution depth stream, the first layer texture streams, the first layer depth streams, the second layer texture streams, and the second layer depth streams of the six surfaces, and the metadata transmitted from the content server 12.

The distribution server 401 also connects to the reproduction apparatus 403 via the network 402. The distribution server 401 transmits the stored low-resolution texture stream and the low-resolution depth stream, the first layer texture stream, the first layer depth stream, the second layer texture stream, and the second layer depth stream of one surface, and the metadata to the reproduction apparatus 403 via the network 402 according to a request from the reproduction apparatus 403.

The reproduction apparatus 403 (image processing apparatus) requests the distribution server 401 for the low-resolution texture stream, the low-resolution depth stream, and the metadata via the network 402 and receives the low-resolution texture stream, the low-resolution depth stream, and the metadata transmitted in response to the request.

The reproduction apparatus 403 also includes the camera 13A. The reproduction apparatus 403 detects the viewing position in the 3D model coordinate system and determines the line-of-sight direction and the field-of-view range of the viewer in the 3D model coordinate system in a manner similar to the home server 13.

The reproduction apparatus 403 then determines a selected surface that is one surface corresponding to the line-of-sight vector closest to the line of sight among the six surfaces of the first layer on the basis of the viewing position and the line-of-sight direction in the 3D model coordinate system and based on the table of the first layer included in the metadata. The reproduction apparatus 403 requests for the first layer texture stream, the first layer depth stream, the second layer texture stream, and the second layer depth stream corresponding to the one selected surface via the network 402. The reproduction apparatus 403 receives the first layer texture stream, the first layer depth stream, the second layer texture stream, and the second layer depth stream corresponding to the one selected surface transmitted in response to the request.

The reproduction apparatus 403 uses the low-resolution texture stream and the low-resolution depth stream as well as the first layer texture stream, the first layer depth stream, the second layer texture stream, and the second layer depth stream corresponding to the one selected surface to generate the display image. The process of generating the display image of the reproduction apparatus 403 is similar to the process of the home server 13 except that the number of selected surfaces is one, and the description will not be repeated. The reproduction apparatus 403 transmits the display image to the conversion apparatus 14 via an HDMI cable not illustrated.

<3. Other Examples of Texture Image>

Figure 20A:
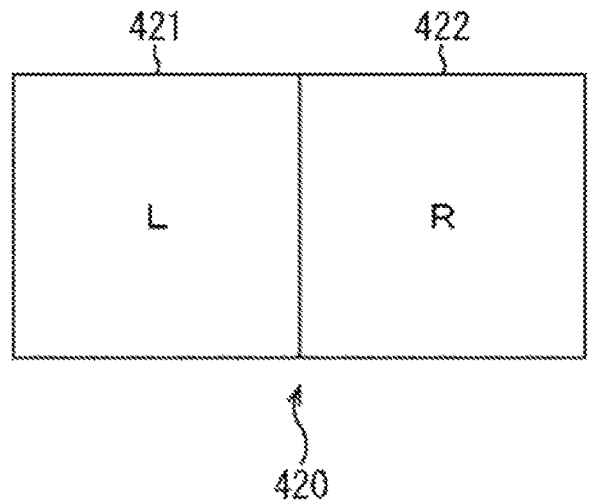
FIGS. 20A and 20B depict another example of texture images of the first layer.
Figure 20B:
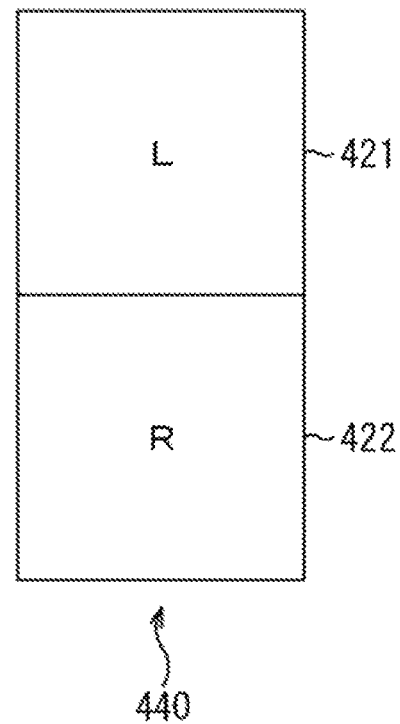

FIGS. 20A and 20B depict other examples of the texture image of the first layer.

Although the texture image of each surface of the first layer is a texture image from one viewpoint O in the description above, texture images from a viewpoint for the left eye and a viewpoint for the right eye corresponding to the viewpoint O may be combined.

Specifically, as illustrated in FIG. 20A, the texture image of each surface of the first layer may be, for example, a packed image 420 in which a texture image 421 of each surface of the first layer from the viewpoint for the left eye and a texture image 422 of each surface of the first layer from the viewpoint for the right eye corresponding to the viewpoint O are packed in the lateral direction (horizontal direction).

In addition, as illustrated in FIG. 20B, the texture image of each surface of the first layer may be, for example, a packed image 440 in which the texture image 421 and the texture image 422 are packed in the longitudinal direction (vertical direction).

Similarly, the texture image of each surface of the second layer may be a packed image in which the texture image of the second layer from the viewpoint for the left eye and the texture image of the second layer from the viewpoint for the right eye are packed in the lateral direction or the longitudinal direction.

In the case where the texture image of each surface of the first and second layers is the packed image in which the texture image from the viewpoint for the left eye and the texture image from the viewpoint for the right eye are packed in the lateral direction or the longitudinal direction, the distance between the eyes of the viewer can be input to the content server 12, and the packed image can be generated according to the input distance between the eyes. Alternatively, the distance between the eyes of the viewer may be input to the home server 13, and the packed image may be generated according to the input distance between the eyes.

In this way, in the case where the texture image of each surface of the first and second layers is a texture image in which images from the viewpoint for the left eye and the viewpoint for the right eye are packed, the texture image obtained as a result of decoding is separated into the texture image from the viewpoint for the left eye and the texture image from the viewpoint for the right eye. Then, three-dimensional data for the left eye and three-dimensional data for the right eye are generated for the first and second layers.

The display image for the left eye is then generated from the three-dimensional data for the left eye on the basis of the viewing direction and the viewing position of the left eye corresponding to the viewing direction and the viewing position of the viewer. The display image for the right eye is also generated from the three-dimensional data for the right eye on the basis of the viewing direction and the viewing position of the right eye corresponding to the viewing direction and the viewing position of the viewer. In a case where the head-mounted display 15 can three-dimensionally display images, the head-mounted display 15 displays the display image for the left eye as an image for the left eye and displays the display image for the right eye as an image for the right eye to three-dimensionally display the display images.

Incidentally, although the photographed images are mapped on the regular octahedron to generate the omnidirectional image in the first and second embodiments, the 3D model for mapping the photographed image may be a sphere, a cube, or the like instead of the regular octahedron. In the case where the photographed images are mapped on the sphere, the omnidirectional image is, for example, an image based on the equirectangular projection of the sphere on which the photographed images are mapped. In addition, instead of the omnidirectional image, a half-omnidirectional image or an image expressing the front with a wide angle may also be generated.

Although the value obtained by the quantization of the distance r (reciprocal 1/r of the distance r) of the straight line to the subject is adopted as the distance information stored as the pixel value of the depth image in the embodiments, a value obtained by quantization of a parallax d may also be adopted. The distance r and the parallax d in the depth direction can be uniquely converted by $r=(L/d)*f$. Here, L represents the horizontal distance between two imaging sensors included in the stereo camera, and f represents the focal length.

In addition, the low-resolution texture stream and the low-resolution depth stream may not be generated. The depth images of the first and second layers may not be generated. In addition, the texture image and the depth image of the second layer may be generated only on part of the surface on which the photographed image of an important subject is mapped.

Furthermore, the low-resolution texture image and the low-resolution depth image may also be layered and generated in a manner similar to the high-resolution texture image and depth image.

4. Third Embodiment (Description of Computer According to Present Disclosure)

The series of processes described above can be executed by hardware or can be executed by software. In the case where the series of processes are executed by software, a program included in the software is installed on a computer. Here, examples of the computer include a computer incorporated into dedicated hardware and a general-purpose personal computer or the like that can execute various functions by installing various programs.

FIG. 21 is a block diagram depicting a configuration example of the hardware of the computer that uses a program to execute the series of processes.

In a computer 500, a CPU (Central Processing Unit) 501, a ROM (Read Only Memory) 502, and a RAM (Random Access Memory) 503 are connected to each other via a bus 504.

An input-output interface 505 is also connected to the bus 504. An input section 506, an output section 507, a storage section 508, a communication section 509, and a drive 510 are connected to the input-output interface 505.

The input section 506 includes a keyboard, a mouse, a microphone, and the like. The output section 507 includes a display, a speaker, and the like. The storage section 508 includes a hard disk, a non-volatile memory, and the like. The communication section 509 includes a network interface and the like. The drive 510 drives a removable medium 511, such as a magnetic disk, an optical disk, a magneto-optical disk, and a semiconductor memory.

In the computer 500 configured in this way, the CPU 501 loads, for example, a program stored in the storage section 508 to the RAM 503 via the input-output interface 505 and the bus 504 and executes the program to thereby execute the series of processes.

The program executed by the computer 500 (CPU 501) can be provided by, for example, recording the program in the removable medium 511 as a package medium or the like. The program can also be provided via a wire or radio transmission medium, such as a local area network, the Internet, and digital satellite broadcasting.

In the computer 500, the removable medium 511 can be mounted on the drive 510 to install the program on the storage section 508 via the input-output interface 505. The program can also be received by the communication section 509 via a wire or radio transmission medium and installed on the storage section 508. In addition, the program can be installed in advance on the ROM 502 or the storage section 508.

Incidentally, the program executed by the computer 500 may be a program in which the processes are executed in chronological order described in the present specification, or the program may be a program for executing the processes in parallel or for executing the processes at a necessary timing such as when the processes are invoked.

5. Application

The technology according to the present disclosure can be applied to various products. For example, the technology according to the present disclosure may be implemented as a device mounted on a type of mobile body, such as a car, an electric car, a hybrid electric car, a motorcycle, a bicycle, a personal mobility, an airplane, a drone, a ship, a robot, a construction machine, and an agricultural machine (tractor).

FIG. 22 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 22, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 22 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section

7420 may be provided as an independent sensor or device, or may be provided as a device in which a plurality of sensors or devices are integrated.

FIG. 23 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 23 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 22, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 22, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 22 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for implementing each function of the image display system 10 (400) according to the present embodiments described with reference to FIGS. 1, 2, 3, 4A, 4B, 5, 6A, 6B, 7, 8A, 8B, 9, 10, 11, 12, 13, 14A, 14B, 15A, 15B, 16, 17, 18, 19, 20A, and 20B may be provided on one of the control units and the like. A computer-readable recording medium storing the computer program may also be provided. Examples of the recording medium include a magnetic disk, an optical disk, a magneto-optical disk, and a flash memory. The computer program may also be distributed via, for example, a network without using the recording medium.

In the vehicle control system 7000 described above, the image display system 10 (400) according to the present embodiments described with reference to FIGS. 1, 2, 3, 4A, 4B, 5, 6A, 6B, 7, 8A, 8B, 9, 10, 11, 12, 13, 14A, 14B, 15A, 15B, 16, 17, 18, 19, 20A, and 20B can be applied to the vehicle control system 7000 of the application illustrated in FIG. 22. For example, the multi-camera 11 of the image display system 10 (400) is equivalent to at least part of the imaging section 7410. In addition, the content server 12, the home server 13 (distribution server 401, network 402, and reproduction apparatus 403), and the conversion apparatus 14 are integrated and are equivalent to the microcomputer 7610 and the storage section 7690 of the integrated control unit 7600. The head-mounted display 15 is equivalent to the display section 7720. Incidentally, in the case where the image display system 10 (400) is applied to the vehicle control system 7000, the camera 13A, the marker 15A, and the gyro sensor 15B are not disposed, and the occupant as a viewer operates the input section 7800 to input the line-of-sight direction and the viewing position of the viewer. In this way, the image display system 10 (400) can be applied to the vehicle control system 7000 of the application illustrated in FIG. 22, and the omnidirectional image can be used to generate a display image of high picture quality.

In addition, at least part of the constituent elements of the image display system 10 (400) described with reference to FIGS. 1, 2, 3, 4A, 4B, 5, 6A, 6B, 7, 8A, 8B, 9, 10, 11, 12, 13, 14A, 14B, 15A, 15B, 16, 17, 18, 19, 20A, and 20B may be implemented in a module (for example, integrated circuit module including one die) for the integrated control unit 7600 illustrated in FIG. 22. Alternatively, the image display system 10 (400) described with reference to FIGS. 1, 2, 3, 4A, 4B, 5, 6A, 6B, 7, 8A, 8B, 9, 10, 11, 12, 13, 14A, 14B, 15A, 15B, 16, 17, 18, 19, 20A, and 20B may be implemented by a plurality of control units of the vehicle control system 7000 illustrated in FIG. 22.

The system in the present specification denotes a set of a plurality of constituent elements (apparatuses, modules (components), and the like), and whether or not all of the constituent elements are in the same housing does not matter. Therefore, a plurality of apparatuses stored in separate housings and connected via a network and one apparatus storing a plurality of modules in one housing are both systems.

Incidentally, the advantageous effects described in the present specification are illustrative only and are not limited. There may be other advantageous effects.

In addition, the embodiments of the present disclosure are not limited to the embodiments described above, and various changes can be made without departing from the scope of the present disclosure.

For example, the present disclosure can be provided as cloud computing in which a plurality of apparatuses share one function and cooperate to execute a process via a network.

In addition, one apparatus can execute each step described in the flow charts, or a plurality of apparatuses can take charge and execute each step.

Furthermore, in the case where one step includes a plurality of processes, one apparatus can execute the plurality of processes included in one step, or a plurality of apparatuses can take charge and execute the processes.

Incidentally, the present disclosure can also be configured as follows.

(1)

An image processing apparatus including an image generating section that generates a display image from a predetermined viewpoint by using a texture image and a depth image of a first layer including a texture image and a depth image of an omnidirectional image and using a texture image and a depth image of a second layer in which a range of information indicated by a pixel value is different from at least one of the texture image or the depth image of the first layer.

(2)

The image processing apparatus according to (1), in which the image generating section generates the display image by using the texture image of the second layer in which a range of an image parameter is different from the texture image of the first layer.

(3)

The image processing apparatus according to (2), in which the image parameter is luminance information indicated by the pixel value, and the image generating section generates the display image by using the texture image of the second layer in which a range of the luminance information indicated by the pixel value is different from the texture image of the first layer.

(4)

The image processing apparatus according to (1) to (3), in which the image generating section generates the display image by using the depth image of the second layer in which a range of a distance parameter is different from the depth image of the first layer.

(5)

The image processing apparatus according to (4), in which the distance parameter is distance information indicated by the pixel value, and the image generating section generates the display image by using the depth image of the second layer in which a range of the distance information indicated by the pixel value is different from the depth image of the first layer.

(6)

The image processing apparatus according any to one of (1) to (5), in which the texture images and the depth images of the first layer and the second layer include texture images and depth images obtained by perspective projection of the texture image and the depth image of the omnidirectional image on a predetermined surface.

(7)

An image processing method executed by an image processing apparatus, the method including the step of generating a display image from a predetermined viewpoint by using a texture image and a depth image of a first layer including a texture image and a depth image of an omnidirectional image and using a texture image and a depth image of a second layer in which a range of information indicated by a pixel value is different from at least one of the texture image or the depth image of the first layer.

(8)

An image processing apparatus including an image generating section that generates a texture image and a depth image of a first layer including a texture image and a depth image of an omnidirectional image and generates a texture image and a depth image of a second layer in which a range of information indicated by a pixel value is different from at least one of the texture image or the depth image of the first layer.

(9)

The image processing apparatus according to (8), in which the image generating section generates the texture image of the second layer in which a range of an image parameter is different from the texture image of the first layer.

(10)

The image processing apparatus according to (9), in which the image parameter is luminance information indicated by the pixel value, and the image generating section generates the texture image of the second layer in which a range of the luminance information indicated by the pixel value is different from the texture image of the first layer.

(11)

The image processing apparatus according to any one of (8) to (10), in which the image generating section generates the depth image of the second layer in which a range of a distance parameter is different from the depth image of the first layer.

(12)

The image processing apparatus according to (11), in which the distance parameter is distance information indicated by the pixel value, and the image generating section generates the depth image of the second layer in which a range of the distance information indicated by the pixel value is different from the depth image of the first layer.

(13)

The image processing apparatus according to any one of (8) to (12), in which the texture images and the depth images of the first layer and the second layer include texture images and depth images obtained by perspective projection of the texture image and the depth image of the omnidirectional image on a predetermined surface.

(14)

An image processing method executed by an image processing apparatus, the method including the step of generating a texture image and a depth image of a first layer including a texture image and a depth image of an omnidirectional image and generating a texture image and a depth image of a second layer in which a range of information indicated by a pixel value is different from at least one of the texture image or the depth image of the first layer.

REFERENCE SIGNS LIST

11 Multi-camera, 12 Content server, 13 Home server, 34 High-resolution Image processing section, 50 First layer generating section, 51 Quantization section, 53 Second layer generating section, 54 Quantization section, 56 Setting section, 57 Metadata generating section, 231 Receiving section, 234 Line-of-sight detecting section, 235 to 237 ML 3D model generating section, 239 Drawing section, 255 3D model generating section, 261 3D model generating section, 501 CPU, 502 ROM, 503 RAM, 506 Input section, 507 Output section, 508 Storage section, 509 Communication section, 510 Drive

The invention claimed is:

1. An image processing apparatus, comprising:
a central processing unit (CPU) configured to:
generate a display image from a specific viewpoint based on:
a first texture image and a first depth image of a first layer of a specific surface, and
a second texture image and a second depth image of a second layer of the specific surface, wherein
the first layer includes a third texture image and a third depth image of an omnidirectional image,
the second depth image of the second layer includes a range of a distance parameter different from that of the first depth image of the first layer, and
the second depth image has a pixel value that indicates the range of the distance parameter of the second depth image.

2. The image processing apparatus according to claim 1, wherein the second texture image of the second layer includes a range of an image parameter different from that of the first texture image of the first layer.

3. The image processing apparatus according to claim 2, wherein the second texture image of the second layer includes a range of luminance information different from that of the first texture image of the first layer, and the second texture image has a pixel value that indicates the range of the luminance information of the second texture image.

4. The image processing apparatus according to claim 1, wherein the first texture image, the second texture image, the first depth image, and the second depth image are obtained by perspective projection of the third texture image and the third depth image of the omnidirectional image on the specific surface.

5. An image processing method, comprising:

generating a display image from a specific viewpoint based on:

first texture image and a first depth image of a first layer of a specific surface, and a second texture image and a second depth image of a second layer of the specific surface, wherein the first layer includes a third texture image and a third depth image of an omnidirectional image, the second depth image includes a range of a distance parameter different from that of the first depth image of the first layer, and the second depth image has a pixel value that indicates the range of the distance parameter of the second depth image.

6. An image processing apparatus, comprising:

a central processing unit (CPU) configured to:

generate a first texture image and a first depth image of a first layer of a specific surface, wherein the first layer includes a third texture image and a third depth image of an omnidirectional image; and generate a second texture image and a second depth image of a second layer of the specific surface, wherein the second depth image includes a range of a distance parameter different from that of the first depth image, and the second depth image has a pixel value that indicates the range of the distance parameter of the second depth image.

7. The image processing apparatus according to claim 6, wherein the second texture image of the second layer includes a range of an image parameter different from that of the first texture image of the first layer.

8. The image processing apparatus according to claim 7, wherein the second texture image of the second layer includes a range of luminance information different from that of the first texture image of the first layer, and the second texture image has a pixel value that indicates the range of the luminance information of the second texture image.

9. The image processing apparatus according to claim 6, wherein the first texture image, the second texture image, the first depth image, and the second depth image are obtained by perspective projection of the third texture image and the third depth image of the omnidirectional image on the specific surface.

10. An image processing method, comprising:

generating a first texture image and a first depth image of a first layer of a specific surface, wherein the first layer includes a third texture image and a third depth image of an omnidirectional image; and generating a second texture image and a second depth image of a second layer of the specific surface, wherein the second depth image includes a range of a distance parameter different from that of the first depth image of the first layer, and the second depth image has a pixel value that indicates the range of the distance parameter of the second depth image.

* * * * *